US012374799B2

(12) United States Patent
Cho et al.

(10) Patent No.: US 12,374,799 B2
(45) Date of Patent: Jul. 29, 2025

(54) ELECTRONIC DEVICE INCLUDING ANTENNA

(71) Applicant: SAMSUNG ELECTRONICS CO., LTD., Suwon-si (KR)

(72) Inventors: Namjun Cho, Suwon-si (KR); Hyoseok Na, Suwon-si (KR); Junghwan Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 18/054,312

(22) Filed: Nov. 10, 2022

(65) Prior Publication Data

US 2023/0163475 A1 May 25, 2023

Related U.S. Application Data

(63) Continuation of application No. PCT/KR2022/095136, filed on Oct. 19, 2022.

(30) Foreign Application Priority Data

Nov. 22, 2021 (KR) ........................ 10-2021-0161047
Jan. 5, 2022 (KR) ........................ 10-2022-0001626

(51) Int. Cl.
*H01Q 1/42* (2006.01)
*H01Q 9/28* (2006.01)

(52) U.S. Cl.
CPC ............. *H01Q 9/285* (2013.01); *H01Q 1/422* (2013.01)

(58) Field of Classification Search
CPC ........ H01Q 9/285; H01Q 1/422; H01Q 21/08; H01Q 21/28; H01Q 1/2283; H01Q 1/243; H01L 21/7621; H01L 2224/29021
See application file for complete search history.

(56) References Cited

U.S. PATENT DOCUMENTS 5,216,435 A * 6/1993 Hirata .................. H01Q 1/3275 343/705
5,708,566 A * 1/1998 Hunninghaus ....... H05K 1/0206 361/720
(Continued)

FOREIGN PATENT DOCUMENTS

CN 1500298 A * 5/2004 ............... H01Q 1/22
DE 112017006442 T5 * 9/2019 ......... H01L 23/4855
(Continued)

OTHER PUBLICATIONS

Search Report and Written Opinion dated Feb. 6, 2023 issued in International Patent Application No. PCT/KR2022/095136.

*Primary Examiner* — Dameon E Levi
*Assistant Examiner* — Jordan E. DeWitt
(74) *Attorney, Agent, or Firm* — Nixon & Vanderhye P.C.

(57) ABSTRACT

According to various embodiment, an electronic device may include: a housing, a first substrate disposed in an inner space of the housing and including a first surface facing a first direction, a second surface facing a direction opposite to the first surface, and a first recess area at least partially corresponding to the first surface, a second substrate at least partially disposed in the first recess area of the first substrate, a third substrate at least partially disposed on one surface of the second substrate and including multiple antenna elements comprising at least one antenna, and a wireless communication circuit disposed on the second surface of the first substrate and electrically connected to the second substrate. The second substrate may include at least one matching circuit electrically connected to the wireless communication circuit corresponding to each of the multiple elements.

10 Claims, 20 Drawing Sheets

(56) References Cited

U.S. PATENT DOCUMENTS

| | | | | |
|---|---|---|---|---|
| 6,084,297 | A * | 7/2000 | Brooks | H01L 23/49816<br>257/E23.114 |
| 6,163,458 | A * | 12/2000 | Li | H01L 23/36<br>257/E23.101 |
| 7,269,017 | B2 * | 9/2007 | Berlin | H05K 1/0206<br>257/713 |
| 7,786,591 | B2 * | 8/2010 | Khan | H01L 23/13<br>257/E23.079 |
| 10,340,234 | B2 | 7/2019 | Kim et al. | |
| 10,574,198 | B2 * | 2/2020 | Shilimkar | H01L 23/047 |
| 10,887,439 | B2 | 1/2021 | Kamgaing et al. | |
| 10,964,652 | B2 * | 3/2021 | Chen | H01L 23/66 |
| 11,063,371 | B2 | 7/2021 | Baek et al. | |
| 11,075,453 | B1 * | 7/2021 | Bulumulla | H01Q 1/422 |
| 11,081,804 | B2 | 8/2021 | Mizunuma et al. | |
| 11,196,146 | B2 * | 12/2021 | Moallem | G01S 7/032 |
| 11,531,084 | B1 * | 12/2022 | James | H01Q 21/0087 |
| 2002/0036345 | A1 * | 3/2002 | Iseki | H01L 21/563<br>257/734 |
| 2002/0079572 | A1 * | 6/2002 | Khan | H01L 23/3677<br>257/E23.092 |
| 2002/0167084 | A1 * | 11/2002 | Coccioli | H01L 24/49<br>257/E23.105 |
| 2006/0065972 | A1 * | 3/2006 | Khan | H01L 23/13<br>257/E23.079 |
| 2006/0110863 | A1 * | 5/2006 | Yamamoto | H01L 24/73<br>438/149 |
| 2007/0296520 | A1 | 12/2007 | Hosokawa et al. | |
| 2008/0297422 | A1 * | 12/2008 | Ishida | H01Q 1/38<br>343/702 |
| 2009/0082075 | A1 * | 3/2009 | Honda | H01Q 1/40<br>361/679.01 |
| 2009/0231225 | A1 * | 9/2009 | Choudhury | H01Q 25/00<br>343/893 |
| 2009/0256752 | A1 * | 10/2009 | Akkermans | H01Q 1/2283<br>343/700 MS |
| 2011/0006862 | A1 * | 1/2011 | Yasooka | H01P 5/08<br>333/230 |
| 2012/0063094 | A1 * | 3/2012 | Gaynes | H05K 3/30<br>29/831 |
| 2013/0070817 | A1 * | 3/2013 | McCormack | H01Q 7/00<br>375/219 |
| 2013/0314284 | A1 * | 11/2013 | Tasaki | H01Q 21/08<br>343/700 MS |
| 2014/0035097 | A1 * | 2/2014 | Lin | H01L 23/66<br>257/E29.325 |
| 2014/0176368 | A1 | 6/2014 | Kamgaing et al. | |
| 2014/0300003 | A1 * | 10/2014 | Kariyazaki | H01L 23/5222<br>257/774 |
| 2015/0214598 | A1 * | 7/2015 | Fujita | H01Q 1/2283<br>343/893 |
| 2015/0229015 | A1 * | 8/2015 | Takagi | H01L 24/00<br>361/783 |
| 2016/0056544 | A1 * | 2/2016 | Garcia | H01Q 9/0407<br>343/725 |
| 2017/0125895 | A1 | 5/2017 | Baks et al. | |
| 2017/0222316 | A1 * | 8/2017 | Mizunuma | H01Q 21/062 |
| 2018/0159203 | A1 * | 6/2018 | Baks | H01Q 9/045 |
| 2018/0233465 | A1 * | 8/2018 | Spella | H01Q 19/28 |
| 2018/0240762 | A1 | 8/2018 | Kamgaing et al. | |
| 2018/0294544 | A1 * | 10/2018 | Takahashi | H01Q 7/00 |
| 2018/0301807 | A1 * | 10/2018 | Clemente | H01Q 3/34 |
| 2019/0081404 | A1 * | 3/2019 | Jeon | H01Q 1/084 |
| 2019/0229413 | A1 * | 7/2019 | Jong | H01Q 1/523 |
| 2020/0006853 | A1 * | 1/2020 | Park | H05K 1/024 |
| 2020/0066663 | A1 * | 2/2020 | Aleksov | H01L 23/00 |
| 2020/0106187 | A1 * | 4/2020 | Ou | H01Q 21/067 |
| 2020/0144722 | A1 * | 5/2020 | Seo | H01Q 21/08 |
| 2020/0153086 | A1 * | 5/2020 | Park | H01Q 9/0407 |
| 2020/0161766 | A1 * | 5/2020 | Liu | H01Q 9/045 |
| 2020/0161767 | A1 * | 5/2020 | Hara | H01Q 9/0414 |
| 2020/0194879 | A1 * | 6/2020 | Lim | H01Q 1/243 |
| 2020/0243948 | A1 * | 7/2020 | Kim | H01Q 5/385 |
| 2020/0266523 | A1 * | 8/2020 | Park | H01Q 5/371 |
| 2020/0279829 | A1 * | 9/2020 | Elsherbini | H01L 25/16 |
| 2020/0287268 | A1 * | 9/2020 | Moon | H01Q 1/02 |
| 2020/0295457 | A1 * | 9/2020 | Yasuo | H10D 30/67 |
| 2020/0329550 | A1 * | 10/2020 | Seo | H05K 1/0203 |
| 2020/0358173 | A1 * | 11/2020 | Jong | H01Q 1/243 |
| 2020/0381804 | A1 * | 12/2020 | Park | H01Q 9/16 |
| 2020/0395650 | A1 * | 12/2020 | Onaka | H01Q 1/243 |
| 2021/0036730 | A1 * | 2/2021 | Bickley | H04B 1/3888 |
| 2021/0218125 | A1 * | 7/2021 | Ali | H01Q 1/38 |
| 2021/0233865 | A1 * | 7/2021 | Tarui | H01Q 21/065 |
| 2021/0234256 | A1 * | 7/2021 | Landesberger | H01Q 15/0086 |
| 2021/0273323 | A1 * | 9/2021 | Bulumulla | H01Q 1/422 |
| 2022/0102310 | A1 * | 3/2022 | Sato | H01Q 19/12 |
| 2022/0115780 | A1 * | 4/2022 | Wang | H01Q 3/36 |
| 2022/0255212 | A1 * | 8/2022 | Edwards | H01Q 1/38 |
| 2022/0263228 | A1 * | 8/2022 | Cho | H01Q 1/38 |
| 2022/0263229 | A1 * | 8/2022 | Cho | H01Q 9/045 |
| 2022/0320743 | A1 * | 10/2022 | Igarashi | H01Q 5/35 |
| 2023/0019425 | A1 * | 1/2023 | Yong | H01Q 1/364 |
| 2023/0061101 | A1 * | 3/2023 | Park | H01Q 5/40 |
| 2023/0062765 | A1 * | 3/2023 | Jo | H01Q 1/243 |
| 2023/0128829 | A1 * | 4/2023 | Young | H01L 23/66<br>343/702 |
| 2023/0140655 | A1 * | 5/2023 | Onaka | H01Q 1/422<br>343/702 |
| 2023/0163475 | A1 * | 5/2023 | Cho | H01Q 1/422<br>343/702 |
| 2023/0209730 | A1 * | 6/2023 | Fujii | H05K 1/03<br>174/250 |
| 2023/0344118 | A1 * | 10/2023 | Wang | H01Q 13/10 |
| 2023/0352841 | A1 * | 11/2023 | Vasanelli | H01Q 1/2283 |
| 2023/0395969 | A1 * | 12/2023 | Gupta | H01L 23/66 |
| 2024/0006742 | A1 * | 1/2024 | Tang | H01Q 1/2283 |
| 2024/0072413 | A1 * | 2/2024 | Ho | H01Q 21/29 |
| 2024/0079782 | A1 * | 3/2024 | Rush | H01Q 1/243 |
| 2024/0154303 | A1 * | 5/2024 | Xing | H01Q 1/48 |
| 2024/0195047 | A1 * | 6/2024 | Hsu | H01Q 1/38 |
| 2024/0213189 | A1 * | 6/2024 | Sugiyama | H01L 24/16 |
| 2024/0297433 | A1 * | 9/2024 | Moallem | H01Q 1/3233 |
| 2024/0356225 | A1 * | 10/2024 | Thai | H01Q 1/50 |
| 2024/0364000 | A1 * | 10/2024 | Waidhas | H01Q 9/30 |

FOREIGN PATENT DOCUMENTS

| | | | | |
|---|---|---|---|---|
| JP | 2010130534 | A * | 6/2010 | H01Q 1/243 |
| JP | 2018186204 | A * | 11/2018 | H01L 21/4817 |
| JP | 2019-097026 | | 6/2019 | |
| KR | 10-0880800 | | 1/2009 | |
| KR | 10-2015-0108147 | | 9/2015 | |
| KR | 10-1587331 | | 1/2016 | |
| KR | 10-2019-0052486 | | 5/2019 | |
| KR | 10-2020-0003509 | | 1/2020 | |
| KR | 10-2020-0119730 | | 10/2020 | |
| KR | 10-2021-0099989 | | 8/2021 | |
| TW | 762197 | B1 * | 4/2022 | H01L 21/4853 |
| WO | WO-2017109878 | A1 * | 6/2017 | H01L 23/02 |

* cited by examiner

ELECTRONIC DEVICE INCLUDING ANTENNA

CROSS-REFERENCE TO RELATED APPLICATIONS

This application is a continuation of International Application No. PCT/KR2022/095136 designating the United States, filed on Oct. 19, 2022, in the Korean Intellectual Property Receiving Office and claiming priority to Korean Patent Application No. 10-2021-0161047, filed on Nov. 22, 2021, in the Korean Intellectual Property Office, and to Korean Patent Application No. 10-2022-0001626, filed on Jan. 5, 2022, in the Korean Intellectual Property Office, the disclosures of all of which are incorporated by reference herein in their entireties.

BACKGROUND

Field

The disclosure relates to an electronic device including an antenna.

Description of Related Art

In line with development of wireless communication technologies, electronic devices (for example, electronic devices for communication) have been widely used in daily life, and content usage has exponentially increased accordingly. Network capacities have gradually reached limitations as a result of such an increase in content usage. In order to satisfy the demand for wireless data traffic that has been increasing since commercialization of $4^{th}$ generation (4G) communication systems, there has been research regarding a communication system (for example, $5^{th}$ generation (5G), pre-5G communication system, or new radio (NR)) for transmitting and/or receiving signals using frequencies in a high-frequency band (for example, mmWave band (for example, about 20 GHz or higher), about 3 GHz-300 GHz band).

An electronic device may include an antenna capable of transmitting and/or receiving signals using frequencies in a high-frequency band (for example, mmWave band, about 3 GHz-300-GHz, band, super-high-frequency band). Antennas (for example, antenna modules) have been developed to have efficient mounting structures for overcoming high levels of free space loss and improving the gain, in view of characteristics of high-frequency bands, and in various types conforming thereto. For example, antennas may include array antennas having various numbers of antenna elements (for example, conductive patches and/or conductive patterns) disposed at an interval on a dielectric structure (for example, substrate).

An electronic device may include a wireless communication circuit (for example, radio frequency front end (RFFE)) for transmitting and/or receiving signals substantially simultaneously through multiple antenna elements included in an array antenna. The wireless communication circuit may include multiple amplification circuits (for example, power amplifier (PA) and/or low noise amplifier (LNA) and/or multiple frequency conversion devices (for example, mixer and/or phase lock loop (PLL)) in order to transmit and/or receive signals through respective antenna elements. The wireless communication circuit (for example, RFFE) may require a relatively larger physical area in proportion to the complexity of the structure thereof.

When a signal is transferred from the wireless communication circuit to the antenna elements included in the array antenna, loss may increase in proportion to the distance between the wireless communication circuit and the antenna elements.

SUMMARY

Embodiments of the disclosure provide a method for designing an electronic device having a reduced physical distance between an antenna (for example, antenna module) and a wireless communication circuit in order to reduce situations in the electronic device has degraded radio-signal performance regarding a high-frequency band.

According to various example embodiments, an electronic device may include: a housing, a first substrate disposed in an inner space of the housing and including a first surface facing a first direction, a second surface facing a direction opposite to the first surface, and a first recess area at least partially corresponding to the first surface, a second substrate disposed in the first recess area of the first substrate, a third substrate at least partially disposed on one surface of the second substrate and including multiple antenna elements including at least one antenna, and a wireless communication circuit disposed on the second surface of the first substrate and electrically connected to the second substrate. The second substrate may include at least one matching circuit electrically connected to the wireless communication circuit corresponding to each of the multiple elements.

According to various example embodiments, an electronic device may include: a housing, a first substrate disposed in an inner space of the housing and including a first surface facing a first direction, a second surface facing a direction opposite to the first surface, a first recess area at least partially corresponding to the first surface, and a second recess area at least partially corresponding to the second surface, a second substrate disposed in the first recess area of the first substrate, a third substrate at least partially disposed on one surface of the second substrate and including multiple antenna elements comprising at least one antenna, and a wireless communication circuit disposed in the second recess area of the first substrate. The second substrate may include at least one matching circuit electrically connected to the wireless communication circuit corresponding to each of the multiple elements.

According to various example embodiments, in order to reduce situations in which signal performance is degraded during wireless communication through a high-frequency band, disposition of respective components may be adjusted so as to reduce the physical distance between a wireless communication circuit and an antenna (for example, antenna module) of an electronic device.

According to an example embodiment, a first substrate may be designed such that an antenna and a wireless communication circuit are disposed adjacent to each other. As a result, signal performance regarding radio signals may be maintained, and the internal space of an electronic device may be utilized more efficiently. Various other advantageous effects identified explicitly or implicitly through the disclosure may be provided.

BRIEF DESCRIPTION OF THE DRAWINGS

In connection with the description of the drawings, like or similar reference numerals may be used for like or similar elements. Further, the above and other aspects, features and advantages of certain embodiments of the present disclosure will be more apparent from the following detailed description, taken in conjunction with the accompanying drawings, in which.

DETAILED DESCRIPTION

Figure 1:
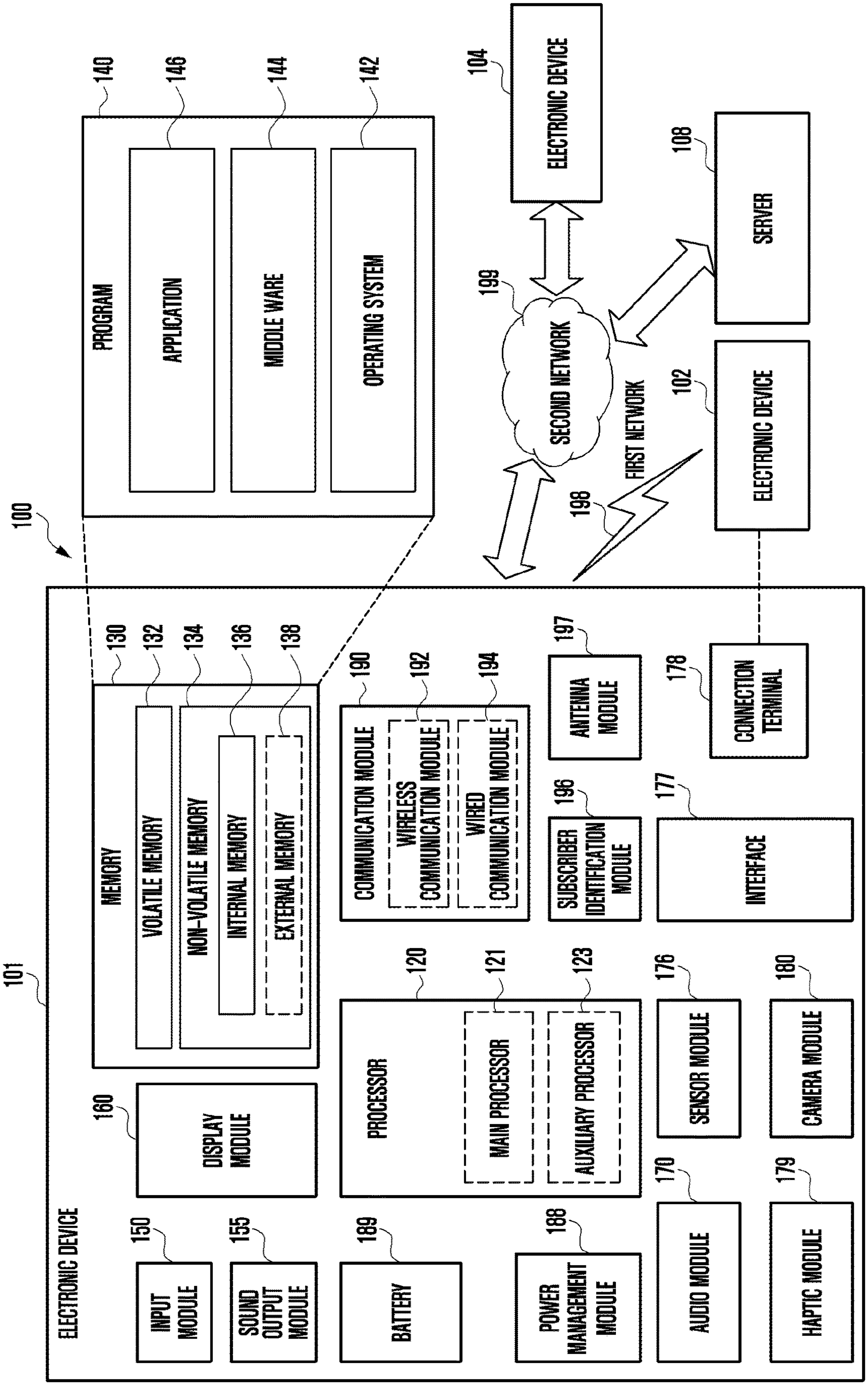
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
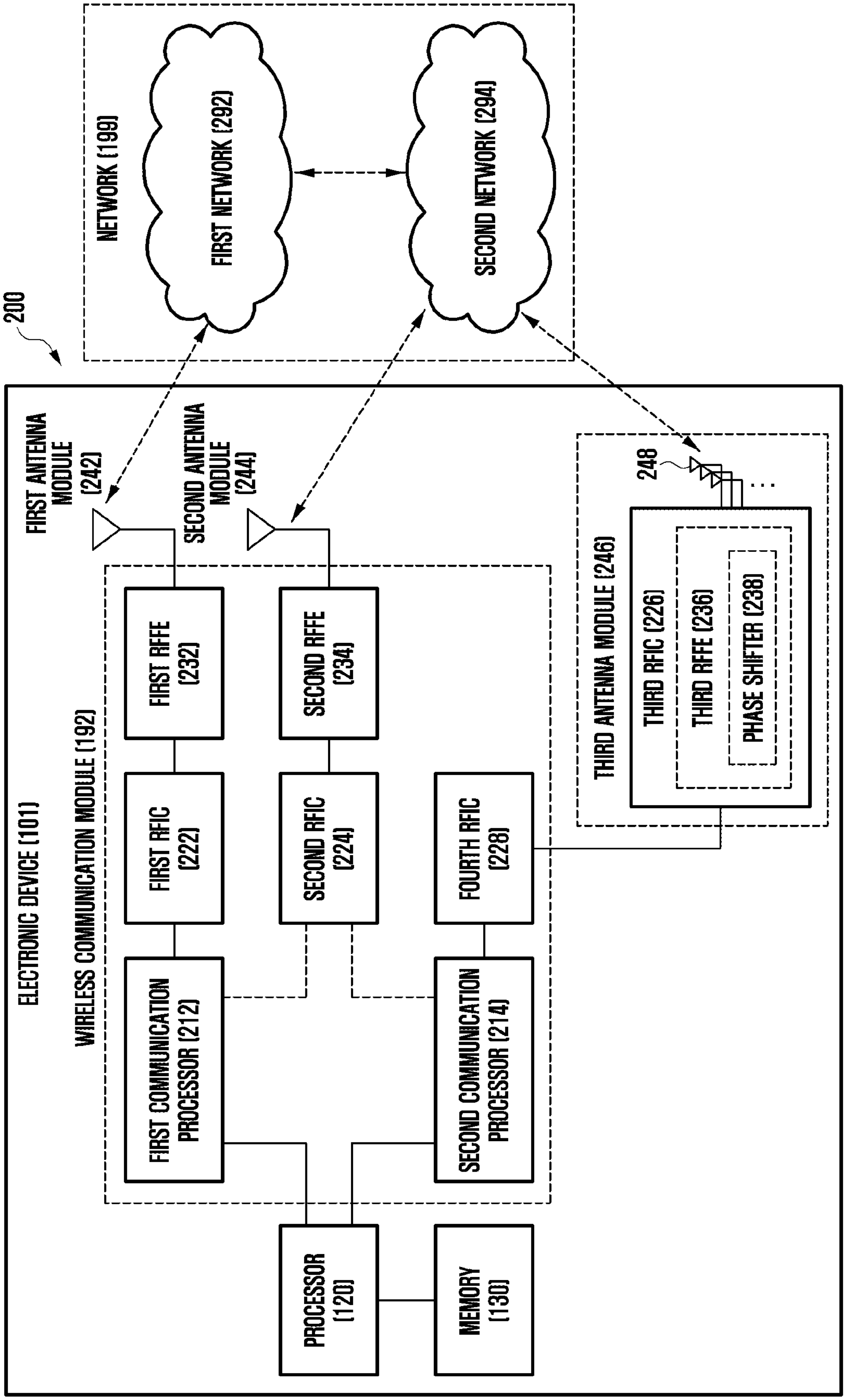
FIG. 2 is a block diagram illustrating an example configuration of an electronic device configured to support legacy network communication and 5G network communication according to various embodiments.

FIG. 2 is a block diagram 200 illustrating an example configuration of an electronic device 101 supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may include various processing circuitry and establish a communication channel of a band to be used for wireless communication with the first network 292, and may support legacy network communication via the established communication channel According to an embodiment, the first network may be a legacy network including second generation (2G), third generation (3G), fourth generation (4G), or long-term evolution (LTE) network. The second communication processor 214 may include various processing circuitry and establish a communication channel corresponding to a designated band (e.g., approximately 6 GHz to 60 GHz) among bands to be used for wireless communication with the second network 294, and may support 5G network communication via the established communication channel According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, so as to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in apart (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3A:
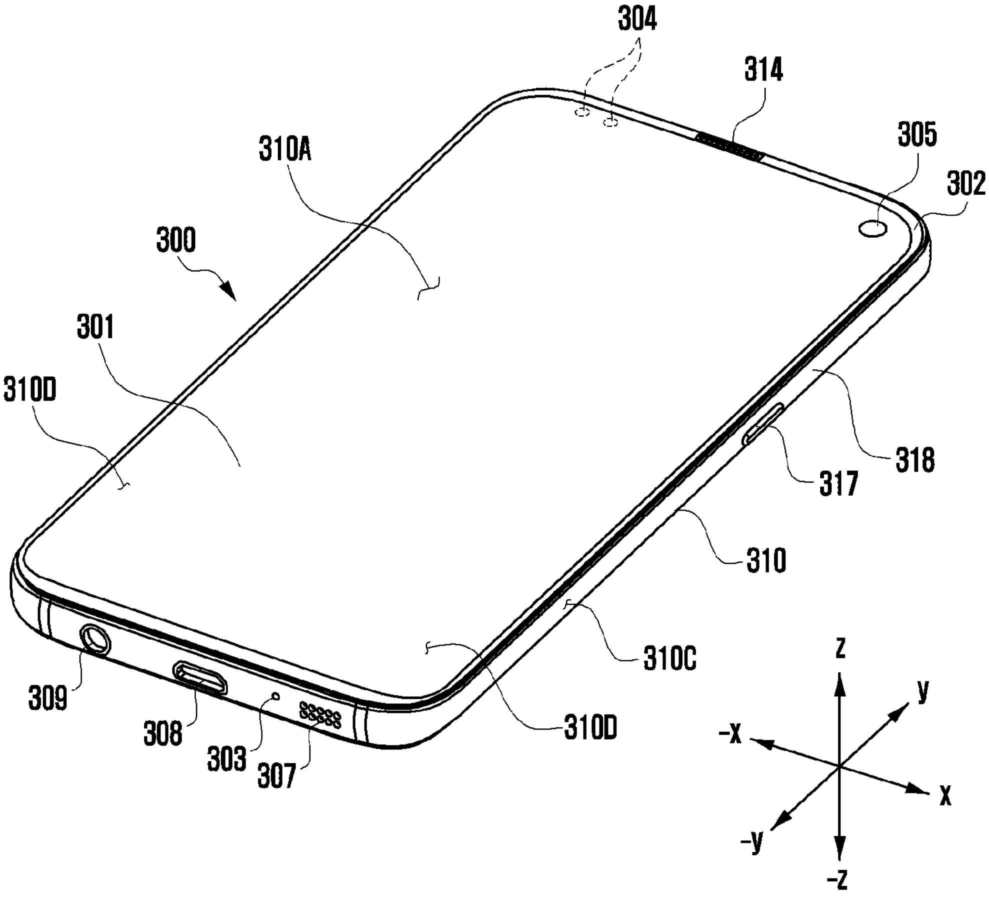
FIG. 3A is a front perspective view of a mobile electronic device according to various embodiments.
Figure 3B:
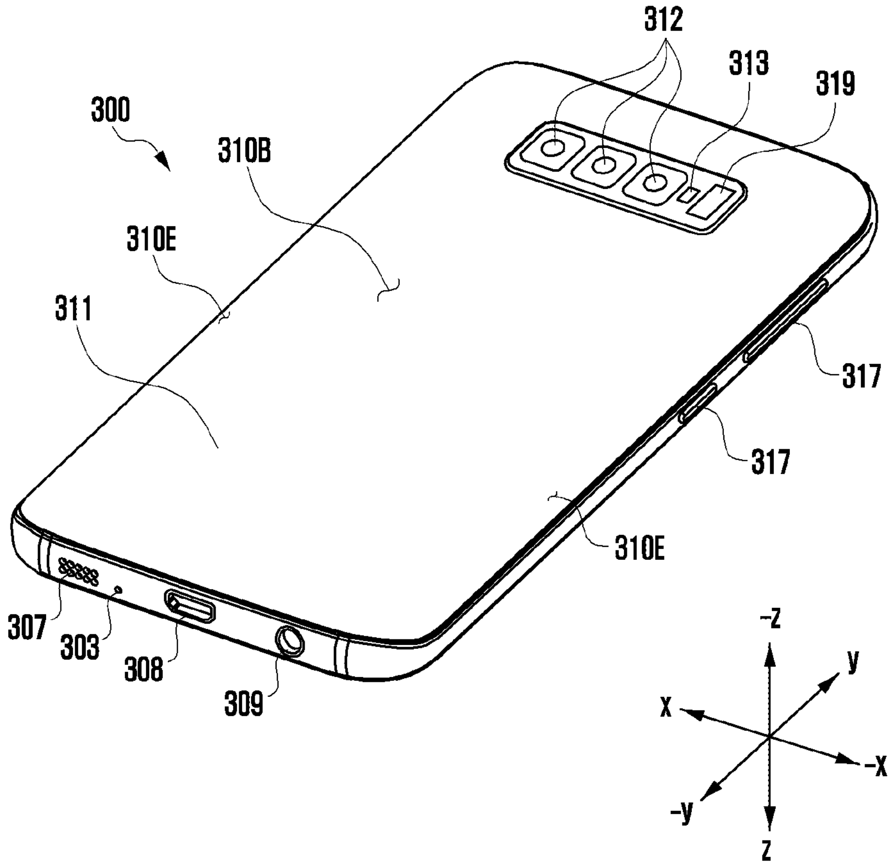
FIG. 3B is a rear perspective view of a mobile electronic device according to various embodiments.

FIG. 3A is a front perspective view of an electronic device 300 according to various embodiments. FIG. 3B is a rear perspective view of the electronic device 300 according to various embodiments. The electronic device 300 in FIGS. 3A and 3B may be at least partially similar to the electronic device 101 of FIG. 1 or FIG. 2, or may include various embodiments of the electronic device.

Referring to FIGS. 3A and 3B, the electronic device 300 (e.g., the electronic device 101 in FIG. 1) according to various embodiments may include a housing 310 including a first surface (or a front surface) 310A, a second surface (or a rear surface) 310B, and a side surface 310C surrounding the space (or the internal space) between the first surface 310A and the second surface 310B. In an embodiment (not illustrated), the term "housing 310" may refer, for example, to a structure forming a part of the first surface 310A, the second surface 310B, and the side surface 310C. According to an embodiment, at least a portion of the first surface 310A may be defined by a substantially transparent front plate 302 (e.g., a glass plate or a polymer plate including various coating layers). The second surface 310B may be defined by a substantially opaque rear plate 311. The rear plate 311 may be made of, for example, coated or colored glass, ceramic, a polymer, or a metal (e.g., aluminum, stainless steel (STS), or magnesium), or a combination of two or more of the above-mentioned materials. The side surface 310C may be defined by a side bezel structure (or a "side member") 318 coupled to the front plate 302 and the rear plate 311 and including a metal and/or a polymer. In some embodiments, the rear plate 311 and the side bezel structure 318 may be integrally configured, and may include the same material (e.g., a metal material such as aluminum).

According to various embodiments, the front plate 302 may include, at the long opposite side edges thereof, first regions 310D, which are bent from the first surface 310A toward the rear plate 311 and extend seamlessly. In the illustrated embodiment (see FIG. 3B), the rear plate 311 may include, at the long opposite side edges thereof, second regions 310E, which are bent from the second surface 310B toward the front plate 302 and extend seamlessly. In various embodiments, the front plate 302 (or the rear plate 311) may include only one of the first regions 310D (or the second regions 310E). In an embodiment, the front plate 302 (or the rear plate 311) may not include a part of the first regions 310D (or the second regions 310E). In an embodiment, when viewed from a side of the electronic device 300, the side bezel structure 318 may have a first thickness (or width) on the side surface portions where the first regions 310D or the second regions 310E are not included, and may have a second thickness (or width), which is smaller than the first thickness, on the side surface portions where the first regions 310D or the second regions 310E are included.

According to an embodiment, the electronic device 300 may include at least one of a display 301, audio modules 303, 307, and 314, sensor modules 304 and 319, camera modules 305, 312, and 313, key input devices 317, an indicator (not illustrated), and connector holes 308 and 309. In some embodiments, in the electronic device 300, at least one of the components (e.g., the key input devices 317, the indicator, or the connector holes 308 and 309) may be omitted, or other components may be additionally included.

According to various embodiments, the display 301 may be viewable through a substantial portion of the front plate 302. In some embodiments, at least a part of the display 301 may be viewable through the front plate 302 defining the first surface 310A and the first regions 310D of the side surface 310C. In some embodiments, the edges of the display 301 may be configured to be substantially the same as the shape of the periphery of the front plate 302 adjacent thereto. In an embodiment (not illustrated), the distance between the periphery of the display 301 and the periphery of the front plate 302 may be substantially constant in order to enlarge the visible area of the display 301.

In an embodiment (not illustrated), a recess or an opening may be disposed in a part of the screen display region of the display 301, and at least one of an audio module 314, a sensor modules 304, a camera module 305, or an indicator aligned with the recess or the opening may be included. In an embodiment (not illustrated), on the rear surface of the screen display region of the display 301, at least one of the audio module 314, the sensor module 304, the camera module 305, or the indicator may be included. For example, the audio module 314, the camera module 305, the sensor module 304 and/or the indicator may be disposed in the internal space in the electronic device 300 to be in contact with the external environment through an opening perforated in the display 301 up to the front plate 302. As another example, some of the sensor modules 304, the camera module 305 and/or the indicator may be disposed in the internal space in the electronic device 300 so as to perform the functions thereof without being viewable through the front plate 302. For example, a region of the display 301 facing the sensor module 304, the camera module 305, and/or the indicator may not require a perforated opening.

In an embodiment (not illustrated), the display 301 may be coupled to or disposed adjacent to a touch-sensitive circuit, a pressure sensor capable of measuring a touch intensity (pressure), and/or a digitizer configured to detect a magnetic-field-type stylus pen. In some embodiments, at least some of the sensor modules 304 and 319 and/or at least some of the key input devices 317 may be disposed in the first regions 310D and/or the second regions 310E.

According to various embodiments, the audio modules 303, 307, and 314 may include a microphone hole 303 and speaker holes 307 and 314. The microphone hole 303 may include a microphone disposed therein so as to acquire external sound, and in some embodiments, multiple microphones disposed therein so as to detect the direction of sound. The speaker holes 307 and 314 may include an external speaker hole 307 and a phone call receiver hole 314. In some embodiments, the speaker holes 307 and 314 and the microphone hole 303 may be implemented as a single hole, or a speaker free of speaker holes 307 and 314 (e.g., a piezo speaker) may be included.

According to various embodiments, the sensor modules 304 and 319 may generate electrical signals or a data value corresponding to the internal operating state of the electronic device 300 or an external environmental state. The sensor modules 304 and 319 may include, for example, a first sensor module 304 (e.g., a proximity sensor) and/or a second sensor module (not illustrated) (e.g., a fingerprint sensor) disposed on the first surface 310A of the housing 310, and/or a third sensor module 319 (e.g., an HRM sensor) disposed on the second surface 310B of the housing 310. A fingerprint sensor may be disposed not only on the first surface 310A (e.g., the display 301) of the housing 310, but also on the second surface 310B. For example, a fingerprint sensor (e.g., an ultrasonic fingerprint sensor or an optical fingerprint sensor) may be disposed below the display 301 of the first surface 310A. The electronic device 300 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 304.

According to various embodiments, the camera modules 305, 312, and 313 may include, for example, a first camera device 305 disposed on the first surface 310A of the electronic device 300 and a second camera device 312 and/or a flash 313 disposed on the second surface 310B of the electronic device 300. The camera modules 305 and 312 may include one or more lenses, an image sensor, and/or an image signal processor. The flash 313 may include, for example, a light-emitting diode or a xenon lamp. In various embodiments, two or more lenses (e.g., an infrared camera, a wide-angle lens, and a telephoto lens), and image sensors may be disposed on one surface of the electronic device 300.

According to various embodiments, the key input devices 317 may be disposed on the side surface 310C of the housing 310. In an embodiment, the electronic device 300 may not include some or all of the key input devices 317, and a key input device 317 not included in the electronic device 300 may be implemented in the form of a soft key on the display 301. In some embodiments, a key input device 317 may be implemented using a pressure sensor included in the display 301.

According to various embodiments, an indicator (not illustrated) may be disposed on the first surface 310A of the housing 310. The indicator may provide, for example, the status information of the electronic device 300 in an optical form. In an embodiment, the indicator may provide, for example, a light source that is interlocked with the operation of the camera module 305. The indicator may include, for example, an LED, an IR LED, and a xenon lamp.

According to various embodiments, the connector holes 308 and 309 may include a first connector hole 308 capable of accommodating a connector (e.g., a USB connector) for transmitting/receiving power and/or data to/from an external electronic device, and/or a second connector hole 309 capable of accommodating a connector (e.g., an earphone jack) for transmitting/receiving an audio signal to/from an external electronic device.

Figure 3C:
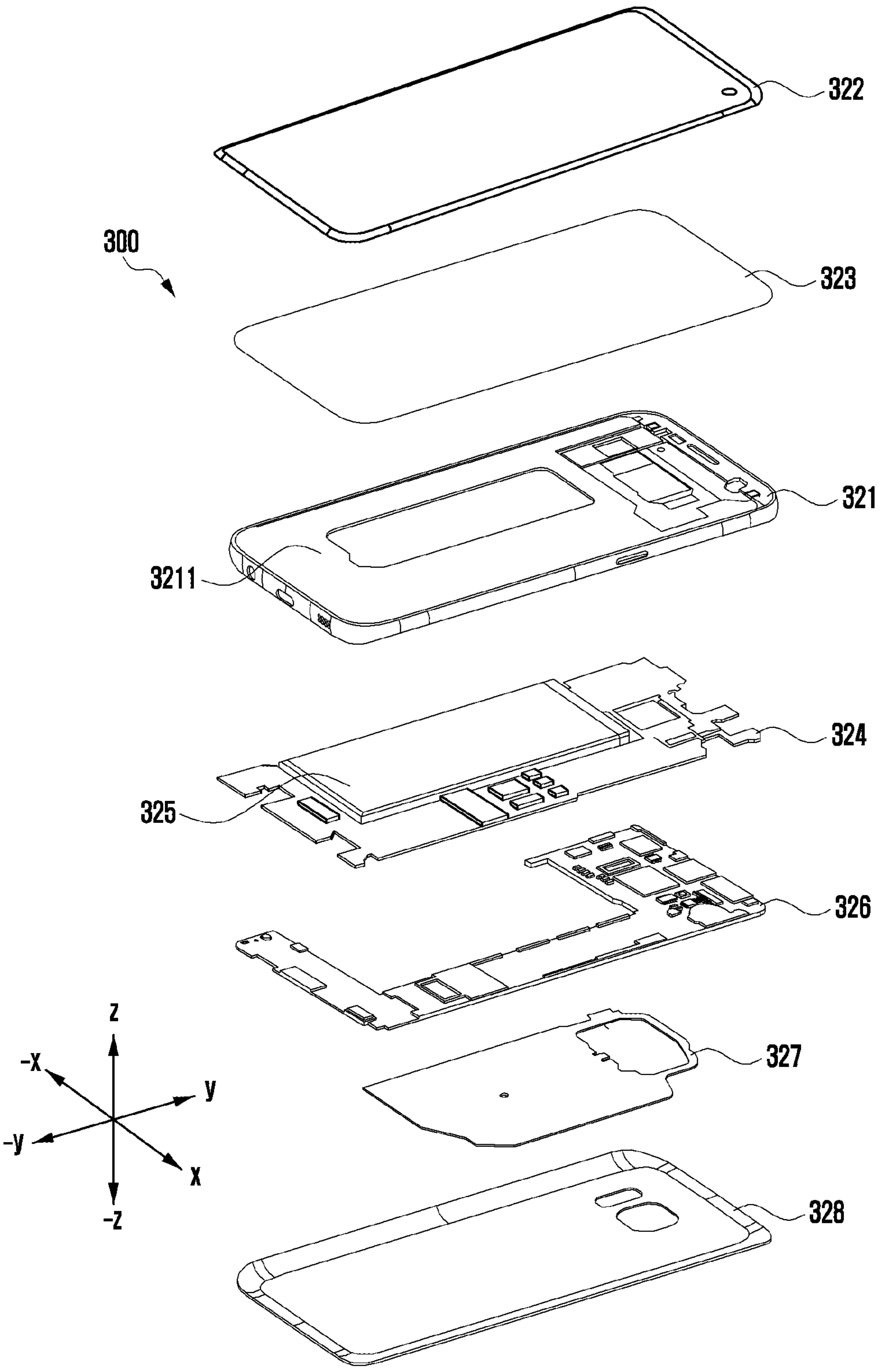
FIG. 3C is an exploded perspective view of a mobile electronic device according to various embodiments.

FIG. 3C is an exploded perspective view of the electronic device 300 according to various embodiments.

Referring to FIG. 3C, according to various embodiments, the electronic device 300 may include a side bezel structure 321, a first support member 3211 (e.g., a bracket), a front plate 322, a display 323, a printed circuit board 324 (e.g., a main board), a battery 325, a second support member 326 (e.g., a rear case), an antenna 327, and a rear plate 328. In some embodiments, at least one of the components (e.g., the first support member 3211 or the second support member 326) may be omitted from the electronic device 300, or other components may be additionally included in the electronic device 300. At least one of the components of the electronic device 300 may be the same as or similar to at least one of the components of the electronic device 300 of FIG. 3A or FIG. 3B, and a redundant description thereof may not be repeated here.

According to various embodiments, the first support member 3211 may be disposed inside the electronic device 300, and the first support member 332 may be connected to the side bezel structure 321, or may be integrated with the side bezel structure 321. The first support member 3211 may be made of, for example, a metal material and/or a non-metal material (e.g., a polymer). The display 323 may be coupled to one surface of the first support member 3211, and the printed circuit board 324 may be coupled to the other surface of the first support member 332. A processor (e.g., the processor 120 in FIG. 1), a memory (e.g., the memory 130 in FIG. 1), and/or an interface (e.g., the interface 177 in FIG. 1) may be mounted on the printed circuit board 324. The processor may include at least one of, for example, a central processing unit, an application processor, a graphics processor, an image signal processor, a sensor hub processor, a communication processor, or the like.

The memory may include, for example, a volatile memory (e.g., the volatile memory 132 in FIG. 1) or a nonvolatile memory (e.g., the nonvolatile memory 134 in FIG. 1).

The interface may include, for example, a high-definition multimedia interface (HDMI), a universal serial bus (USB) interface, an SD card interface, and/or an audio interface. The interface may electrically or physically connect, for example, the electronic device 300 to an external electronic device, and may include a USB connector, an SD card/MMC connector, or an audio connector.

According to various embodiments, the battery 325 may include a device for supplying power to at least one component of the electronic device 300 and may include, for example, a non-rechargeable primary battery, a rechargeable secondary battery, or a fuel cell. At least a portion of the battery 325 may be disposed on substantially the same plane as, for example, the printed circuit board 324. The battery 325 may be integrally disposed inside the electronic device 300, or may be detachably disposed on the electronic device 300.

According to various embodiments, the antenna 327 may be disposed between the rear plate 328 and the battery 325. The antenna 327 may include, for example, a near field communication (NFC) antenna, a wireless charging antenna, and/or a magnetic secure transmission (MST) antenna, or the like. The antenna 327 may perform short-range communication with, for example, an external electronic device, or may transmit/receive power required for charging to/from the external device in a wireless manner. In an embodiment, an antenna structure may be a part of the side bezel structure 321 and/or the first support member 3211, or a combination thereof.

According to various embodiments, the electronic device 300 may have a bar-type or plate-type appearance, but the appearance of the electronic device 300 is not limited thereto. For example, the electronic device 300 may be a part of a foldable electronic device, a slidable electronic device, a stretchable electronic device, and/or a rollable electronic device.

Figure 4A:
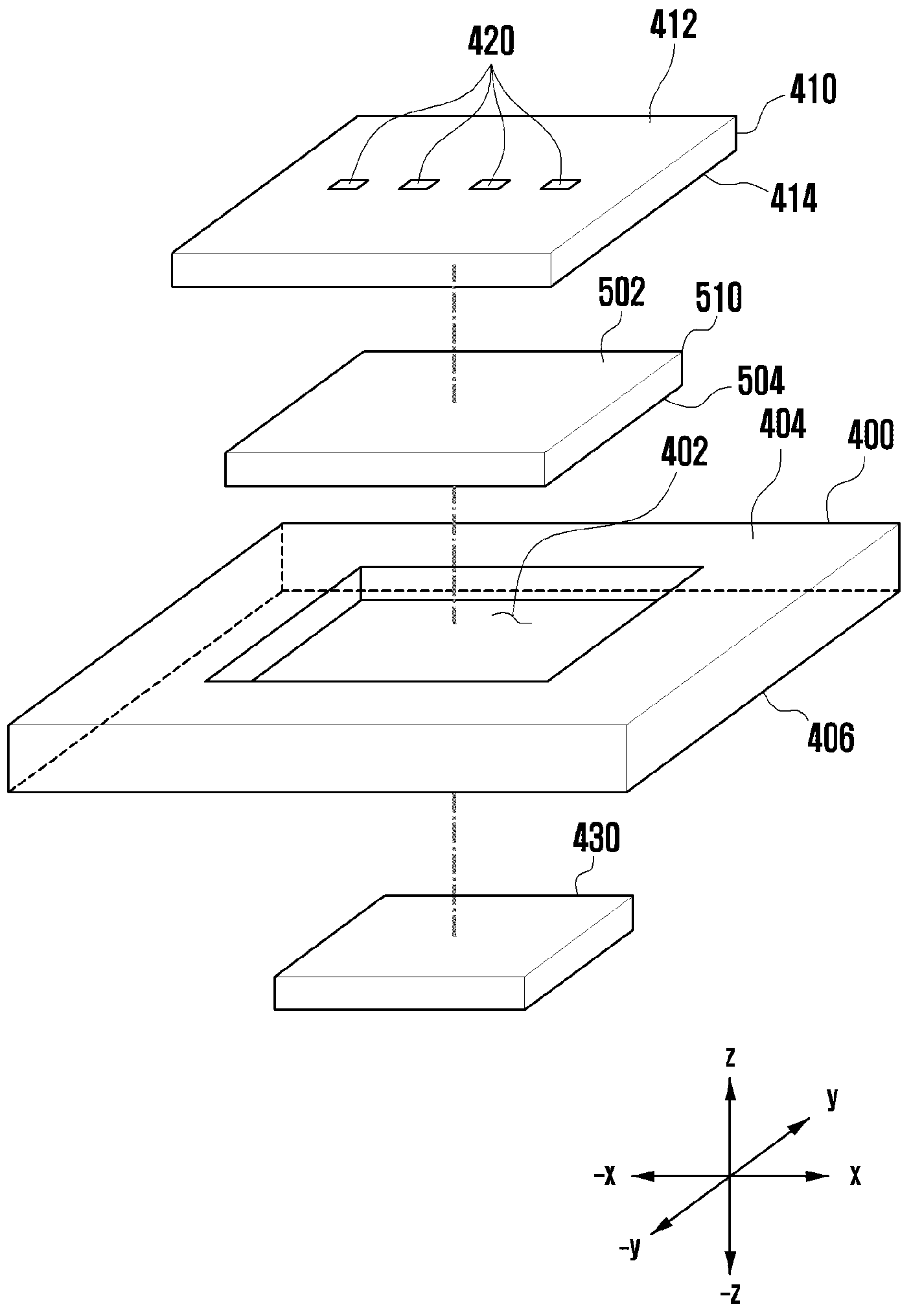
FIG. 4A is an exploded perspective view illustrating a first example of a structure in which an antenna structure, a first substrate, a second substrate, and/or a wireless communication circuit are arranged according to various embodiments.
Figure 4B:
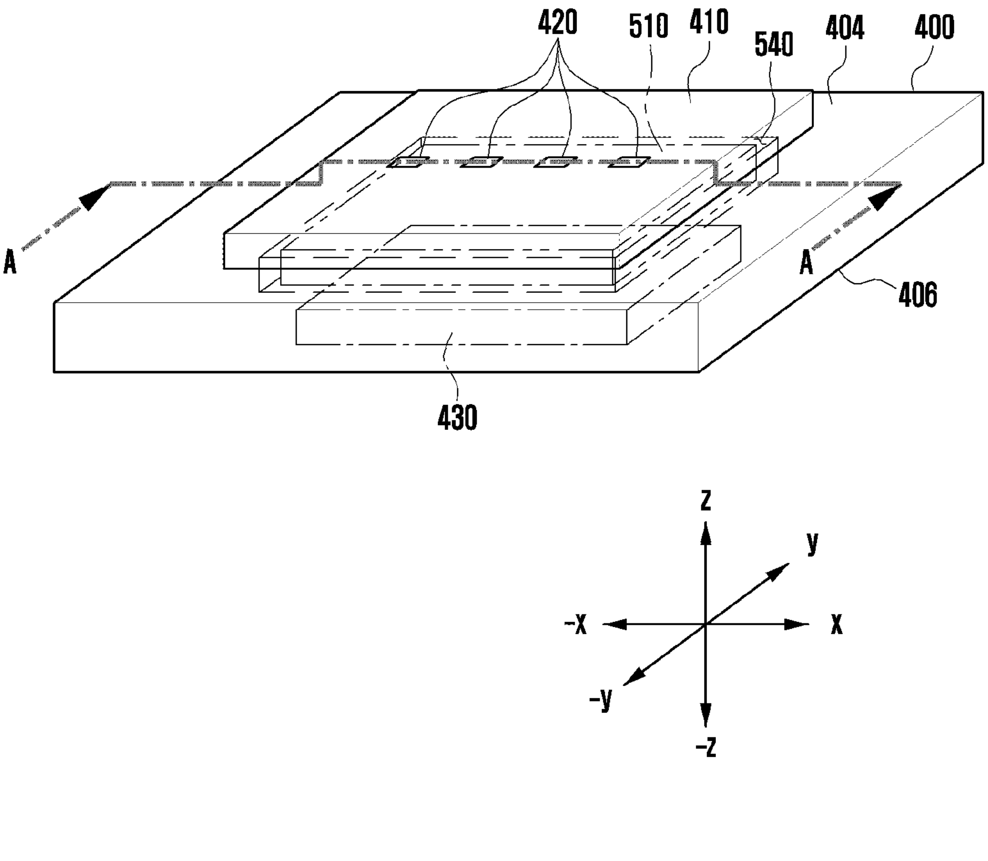
FIG. 4B is a perspective view illustrating a second example of a structure in which an antenna structure, a first substrate, a second substrate, and/or a wireless communication circuit are arranged according to various embodiments.

FIG. 4A is an exploded perspective view illustrating a first example of a structure in which an antenna structure 410, a first substrate 400 (e.g., a first printed circuit board (PCB) and a main PCB), a second substrate 510 (e.g., a second printed circuit board (PCB), and a sub-PCB), and/or a wireless communication circuit 430 is arranged according to various embodiments. FIG. 4B is a perspective view illustrating a second example of a structure in which an antenna structure 410, a first substrate 400, a second substrate 510, and/or a wireless communication circuit 430 are arranged according to various embodiments. According to an embodiment, the antenna structure 410 of FIG. 4A and FIG. 4B may be at least partially similar to the third antenna module 246 in FIG. 2 or may include various embodiments of an antenna module.

According to various embodiments with reference to FIG. 4A and FIG. 4B, the antenna structure 410 may include at least one antenna element 420. For example, the antenna structure 410 may be implemented as an array antenna having a form in which at least one antenna element 420 is disposed at regular intervals and may be electrically connected to the wireless communication circuit 430 through the second substrate 510. For another example, the antenna structure 410 may include a substrate and at least one antenna element 420 may be formed on the substrate.

According to various embodiments with reference to FIG. 4A and FIG. 4B, the first substrate 400 may include a recess area 402 (as used herein, the term recess may include various structures configured to receive a substrate e.g., including, but not limited to, a furrow, a groove, an opening, a recess, a hole, a cavity, or the like) such that the second substrate 510 is at least partially coupled thereto. For example, the second substrate 510 may be disposed to be inserted into the recess area 402 of the first substrate 400 and may be electrically connected to the wireless communication circuit 430 through the first substrate 400. According to an embodiment, the second substrate 510 may be disposed to be inserted into the recess area 402 formed on the first substrate 400 as shown in FIG. 4B when a first surface 404 of the first substrate 400 is viewed from above (e.g., viewed from the z-axis direction along the −z-axis direction).

According to an embodiment, the antenna structure 410 may include a first surface 412 (e.g., a surface exposed to the outside when viewed from above (e.g., viewed from the z-axis direction along the −z-axis direction)) and a second surface 414 facing an opposite direction (e.g., the −z-axis direction) of the first surface 412. For example, the antenna structure 410 may be disposed to cover the second substrate 510. The antenna structure 410 may be disposed to have a form in which the second surface 414 of the antenna structure 420 is at least partially attached to the first surface 404 of the first substrate 400. For another example, the antenna structure 410 may be disposed to have a form of generally covering the recess area 402 such that the recess area 402 is not exposed to an external environment. According to an embodiment, the second substrate 510 may be disposed to overlap the antenna structure at least partially 410 when viewed from above (e.g., viewed from the z-axis direction along the −z-axis direction). According to an embodiment, the at least one antenna element 420 included in the antenna structure 410 may be electrically connected to the second substrate 510 and electrically connected to the wireless communication circuit 430 through the first substrate 400. According to an embodiment, an electronic device (e.g., the electronic device 101 in FIG. 1 and the electronic device 300 in FIG. 3) may perform wireless communication through the antenna structure 410 under the control of the wireless communication circuit 430.

According to various embodiments, the second substrate 510 may include a first surface 502 and a second surface 504 facing an opposite direction of the first surface 502. The first surface 502 of the second substrate 510 may be electrically and/or physically connected to the second surface 414 of the antenna structure 410, and the second surface 504 of the second substrate 510 may be electrically and/or physically connected to the first substrate 400 in a form of being inserted into the recess area 402 of the first substrate 400.

According to an embodiment, the second substrate 510 may include multiple conductive layers and multiple non-conductive layers alternately stacked with the conductive layers. The second substrate 510 may provide electrical connection between electronic components arranged on the second substrate 510 and/or outside using wires and conductive vias formed on the conductive layer. According to an embodiment, the second substrate 510 may include at least one matching circuit for electrically connecting the wireless communication circuit 430 and at least one antenna element 420 included in the antenna structure 410. According to an embodiment, the first substrate 400 may include at least one via for electrically connecting the second substrate 510 and the wireless communication circuit 430.

According to an embodiment, the second substrate 510 may be designed to have permittivity (e.g., tan δ) relatively lower than that of the first substrate 400. For example, the permittivity may a figure indicating a degree of polarization of molecules with respect to an electrical signal. The lower the permittivity, the better the insulation and the lower the transmission loss of an electrical signal. For example, when a permittivity (tans) of the first substrate 400 is about 0.03, a permittivity of the second substrate 510 may be about 0.002. For example, the low permittivity may refer, for example, to a low transmission loss of an electrical signal and a high transmission efficiency. The second substrate 510 may have a permittivity relatively lower than that of the first substrate 400, a fast electrical signal processing speed, and a lower transmission loss with respect to an electrical signal.

According to an embodiment, the second substrate 510 may include at least one matching circuit and increase transmission efficiency with respect to an electrical signal between the wireless communication circuit 430 and the antenna structure 410. For example, the at least one matching circuit may be electrically connected correspondingly to each of at least one antenna element 420.

According to an embodiment, the wireless communication circuit 430 may be electrically connected to at least one circuit (e.g., a communication processor, a matching circuit, and/or a PMIC) disposed on the second substrate 510 through the first substrate 400. For example, the wireless communication circuit 430 may be connected to at least one circuit (e.g., a communication processor, a matching circuit, and/or a PMIC) included in the second substrate 510 through at least one via included in the first substrate 400 and may perform transmission and/or reception of a signal (e.g., a control signal, a baseband signal, or an IF signal). The wireless communication circuit 430 may perform wireless communication with an external device (e.g., a server) through the antenna structure 410 electrically connected to the second substrate 510.

Figure 5:
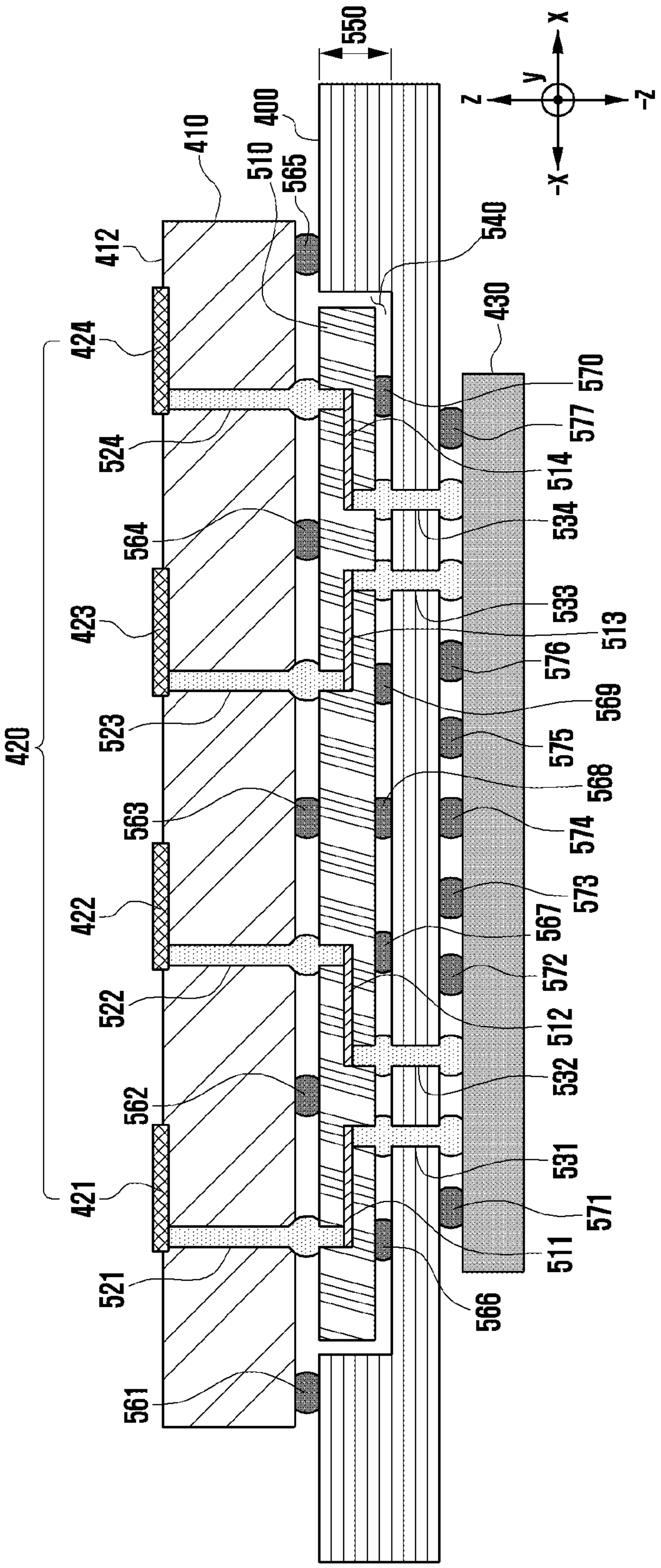
FIG. 5 is a cross-sectional view of an antenna structure, a first substrate, a second substrate, and/or a wireless communication circuit taken along line A-A of FIG. 4B according to various embodiments.

FIG. 5 is a cross-sectional view of an antenna structure 410, a first substrate 400, a second substrate 510, and/or a wireless communication circuit 430 taken along line A-A of the FIG. 4B according to various embodiments. According to an embodiment, the antenna structure 410 of FIG. 5 may be at least partially similar to the third antenna module 246 in FIG. 2 or may include various embodiments of an antenna module.

According to various embodiments with reference to FIG. 5, the first substrate 400 may include multiple conductive layers and/or multiple non-conductive layers alternately stacked with the conductive layers. The first substrate 400 may be implemented to have a form in which multiple layers are stacked. According to an embodiment, the first substrate 400 may include a recess area 540 (e.g., the recess area 402 in FIG. 4A, and a groove) such that the second substrate 510 is at least partially coupled thereto. For example, some layers among multiple layers forming the first substrate 400 may be designed to include an opening. The first substrate 400 may be implemented to have a form in which layers including an opening and layers not including an opening are stacked. Referring to FIG. 5, the recess area 540 may include a form in which layers including an opening are stacked to form a groove having a depth of a first length 550 on the first substrate 400. For example, when the first substrate 400 is formed by stacking based on about 10 layers, about four layers disposed adjacent to the wireless communication circuit 430 may be formed by stacking layers not including an opening, and about six remaining layers may be formed by stacking layers including an opening. For example, the opening may be implemented to have substantially the same size and the recess area 540 for allowing the second substrate 510 to be inserted thereto may be formed based on the opening. The layers (e.g., about six layers) including an opening may be included in a first group and the layers (e.g., about four layers) not including an opening may be included in the second group. For example, the recess area 540 may be formed based on a size of the second substrate 510. Referring to FIG. 5, the first substrate 400 may include at least one via 531, 532, 533, 534 for electrically connecting between the second substrate 510 and the wireless communication circuit 430. For example, the at least one via 531, 532, 533, 534 may be used as an electrical connection path respectively corresponding to at least one matching circuit 511, 512, 513, 514 included in the second substrate 510. For example, the at least one via 531, 532, 533, 534 may include a first via 531, a second via 532, a third via 533, and/or a fourth via 534.

Referring to FIG. 5, the second substrate 510 may be at least partially inserted into or coupled to the recess area 540 of the first substrate 400. According to an embodiment, the second substrate 510 may include multiple conductive layers and/or multiple non-conductive layers alternately stacked with the multiple conductive layers. In an embodiment, a thickness of the second substrate 510 may be determined based on a depth (e.g., the first length 550) of the recess area 540 formed on the first substrate 400. For example, multiple layers corresponding to the recess area 540 may be included in a first group and the recess area 540 may be implemented by stacking the layers included in the first group. In an embodiment, the second substrate 510 may be designed to include at least one matching circuit 511, 512, 513, 514 based on the conductive layers and/or the non-conductive layers, and the at least one matching circuit 511, 512, 513, 514 may be used as a transmission path with respect to a signal. For example, the at least one matching circuit 511, 512, 513, 514 may include a first matching circuit 511, a second matching circuit 512, a third matching circuit 513, and/or a fourth matching circuit 514. The first matching circuit 511 may be electrically connected to the wireless communication circuit 430 through the first via 531 of the first substrate 400. A contact part corresponding to one end of the first matching circuit 511 may be determined based on a position of the first via 531. According to an embodiment, at least one of the at least one matching circuit 511, 512, 513, 514 may be connected to the at least one via 531, 532, 533, 534 of the first substrate 400. For another example, the at least one matching circuit 511, 512, 513, 514 is omitted and at least one signal line may be formed. According to an embodiment, various types of circuits (e.g., a signal line and a signal wire) may be included in the second substrate 510 based on stacked multiple layers.

According to an embodiment, one end of the at least one matching circuit 511, 512, 513, 514 may be electrically connected to the at least one antenna element 420 included in the antenna structure 410, and another end thereof may be electrically connected to the wireless communication circuit 430.

Referring to FIG. 5, in an embodiment, the at least one antenna element 420 may be disposed on the first surface 412 (e.g., a surface seen when viewed from above (e.g., viewed from the z-axis direction along the −z-axis direction)) or adjacent to the first surface 412 of the antenna structure 410. For example, the at least one antenna element 420 may include a first antenna element 421, a second antenna element 422, a third antenna element 423, and/or a fourth antenna element 424. The antenna structure 410 may include at least one circuit 521, 522, 523, 524 (e.g., a wire, a line, a hole, and a via) for electrically connecting the at least one antenna element 420 and the at least one matching circuit 511, 512, 513, 514 included in the second substrate 510. For example, the at least one circuit 521, 522, 523, 524 may include a first circuit 521, a second circuit 522, a third circuit 523, and/or a fourth circuit 524. According to an embodiment, the first antenna element 421 may be electrically connected to the first matching circuit 511 of the second substrate 510 through the first circuit 521, and the second antenna element 422 may be electrically connected to the second matching circuit 512 of the second substrate 510 through the second circuit 522. For example, the at least one antenna element 420 may be connected to the at least one matching circuit 511, 512, 513, 514 of the second substrate 510. In an embodiment, the antenna structure 410 may be disposed in a form of at least partially covering the recess area 540 of the first substrate 400. For example, when viewed from above (e.g., viewed from the z-axis direction along the −z-axis direction), the antenna structure 410 may be in a state at least partially overlapping the second substrate 510 coupled to the recess area 540.

According to an embodiment, the wireless communication circuit 430 may be electrically connected to the first matching circuit 511 of the second substrate 510 through the first via 531 of the first substrate 400 and may be electrically connected to the first antenna element 421 included in the antenna structure 410 through the first matching circuit 511. The wireless communication circuit 430 may perform wireless communication with an external device (e.g., a server) through the at least one antenna element 420, 421, 422, 423, 424. According to an embodiment, the wireless communication circuit 430 may convert a frequency with respect to a wireless signal in a high frequency band (e.g., an mmWave band), or perform an amplification function with respect to the wireless signal. For example, the wireless communication circuit 430 may include an LNA and/or a PA, perform an amplification function using an LNA when receiving a wireless signal, and perform an amplification function using a PA when transmitting a wireless signal. According to an embodiment, the wireless communication circuit 430 may include a split/combiner and phase shifter circuit, and may control a phase difference with respect to multiple high frequency band signal using the split/combiner and phase shifter circuit. According to an embodiment, the wireless communication circuit 430 may at least partially combine electromagnetic signals input or output through the multiple antenna elements, and generate a signal in a beam form having directionality and control the signal to be emitted along a configured direction.

According to an embodiment, the first substrate 400, the second substrate 510, the antenna structure 410, and the wireless communication circuit 430 may be at least partially fixed, based on a conductive bonding process 561-577 (e.g., soldering and a soldering process). For example, the second substrate 510 may be disposed to be inserted into the recess area 540 of the first substrate 400 and may be at least partially fixed to the first substrate 400, based on the conductive bonding process 566, 567, 568, 569, 570. The antenna structure 410 may be at least partially fixed to the first substrate 400 and the second substrate 510, based on the conductive bonding process 561, 562, 563, 564, 565. The wireless communication circuit 430 may be at least partially fixed to a lower surface of the first substrate 400, based on the conductive bonding process 571, 572, 573, 574, 575, 576, 577. According to an embodiment, each of substrates may be fixed to each other through a conductive bonding process (e.g., soldering), thus reinforcing rigidity of each substrate. The conductive bonding process may not be limited to a specific position and performed in consideration of placement of internal components and a wire structure.

According to an embodiment, the antenna structure 410 (e.g., the third substrate), the first substrate 400, and/or the second substrate 510 may be designed to have different characteristics. For example, since high-speed signal transmission is not essential and a size and integration are high, the first substrate 400 may be implemented based on a material not causing much cost when designed. The first substrate 400 may have a relatively high transmission loss compared to the antenna structure 410 and the second substrate 510. The antenna structure 410 may be implemented to have a small size antenna to reduce a resonant wavelength length at a desired operating frequency. The antenna structure 410 (e.g., the third substrate) may be implemented to have a high dielectric constant (DK) (e.g., a relative dielectric constant) value to be implemented to have a small size antenna. For example, the DK value may indicate a ratio of a dielectric constant of a measuring object and a dielectric constant in a vacuum state (e.g., air) (e.g., a relative dielectric constant is about 1). The antenna structure 410 may be implemented to have substantially the same permittivity as that of the second substrate 510 to reduce transmission loss with respect to an electrical signal. For example, the second substrate 510 may be designed to have a form in which multiple layers are stacked, and a distance between a layer including the matching circuit 511, 512, 513, 514 and a GND layer may be small. The second substrate 510 may be designed to have a thick thickness of the matching circuit 511, 512, 513, 514 to facilitate impedance tuning with respect to an electrical signal and may be implemented to have a low dielectric constant (DK) (e.g., a relative dielectric constant) value. A thickness of the second substrate 510 may be determined based on a depth (e.g., the first length 550) of the recess area 540. For example, the second substrate 510 may be implemented, based on a material (e.g., a liquid crystal polymer) having a low relative dielectric constant. According to an embodiment, the second substrate 510 may be implemented to have DK and permittivity relatively lower than those of the first substrate 400 and/or the antenna structure 410.

According to an embodiment, a size of the second substrate 510 may be determined based on a size of the recess area 540 included in the first substrate 400. The second substrate 510 may be disposed to be inserted into the recess area 540 and thus a whole thickness including the second substrate 510, the antenna structure 410, and the first substrate 400 may be reduced. According to an embodiment, space utilization with respect to the inside of the electronic device 101 may be improved.

Figure 6A:
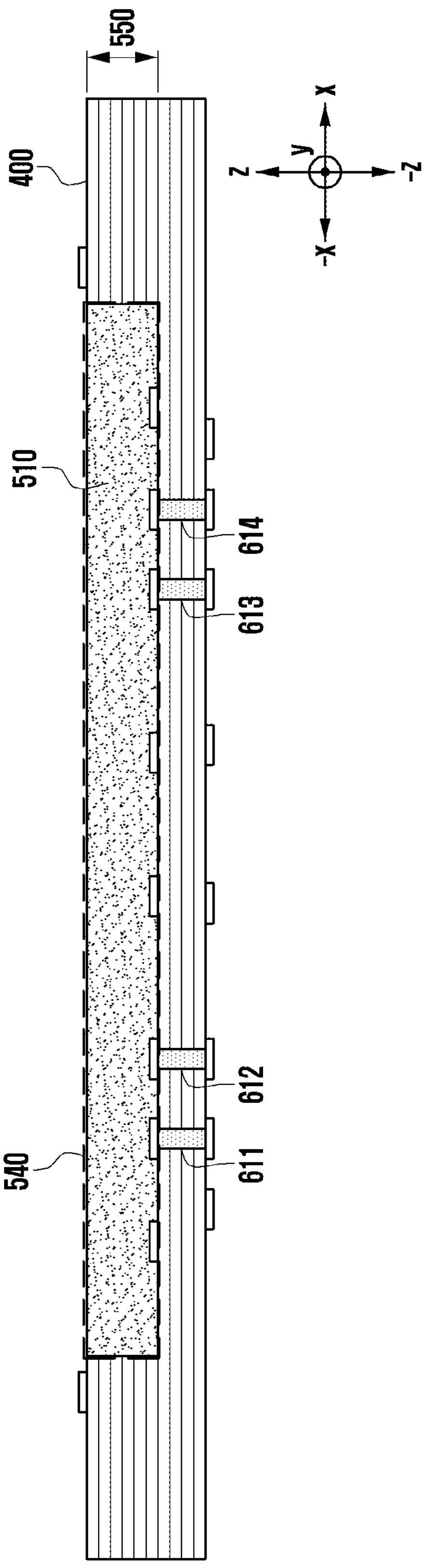
FIG. 6A is a cross-sectional view illustrating an example first process of manufacturing a first substrate according to various embodiments.
Figure 6B:
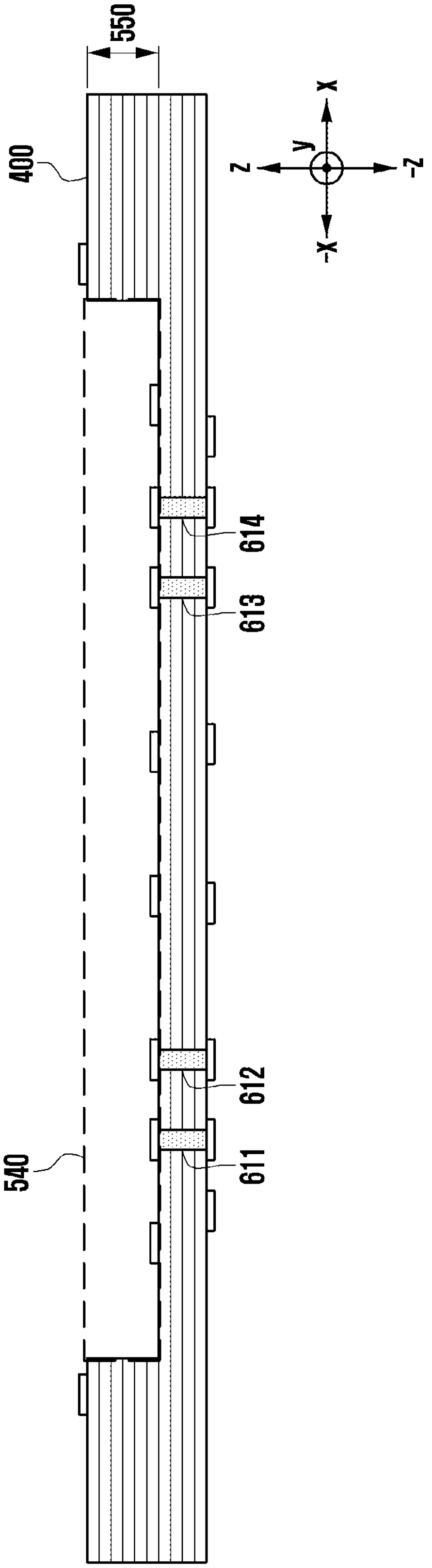
FIG. 6B is a cross-sectional view illustrating an example second process of manufacturing a first substrate according to various embodiments.
Figure 6C:
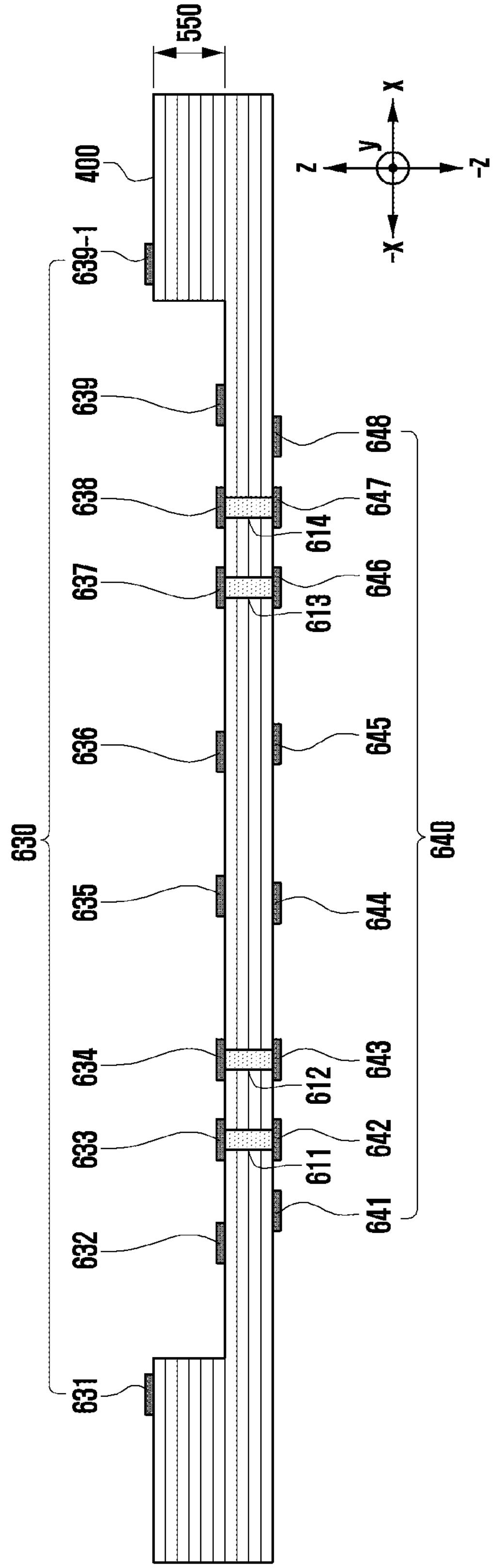
FIG. 6C is a cross-sectional view illustrating an example third process of manufacturing a first substrate according to various embodiments.
Figure 6D:
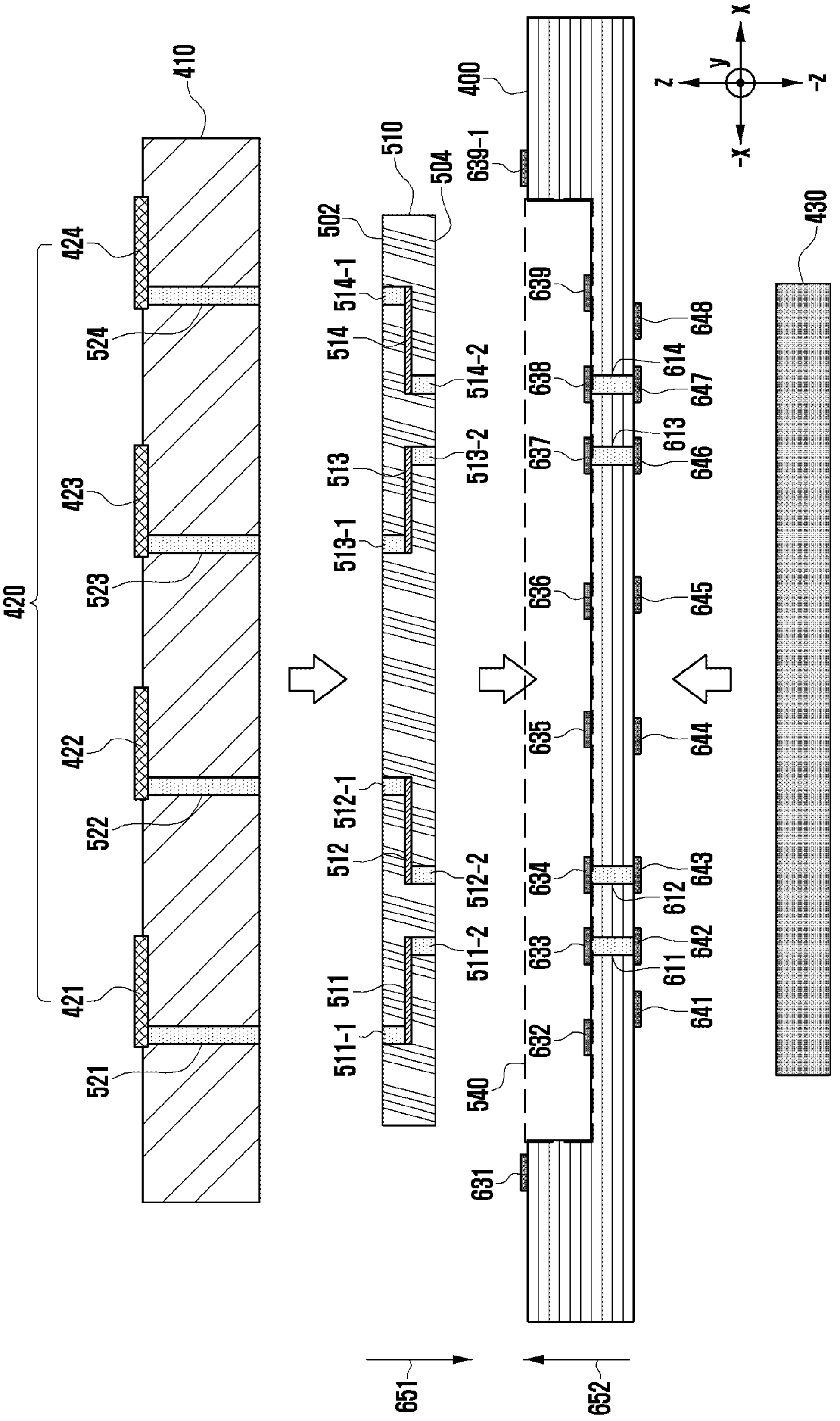
FIG. 6D is an exploded cross-sectional view illustrating an example of an operation of coupling an antenna structure, a second substrate, a first substrate, and/or a wireless communication circuit according to various embodiments.

FIG. 6A is a cross-sectional view illustrating a first process of manufacturing a first substrate 400 according to various embodiments. FIG. 6B is a cross-sectional view illustrating a second process of manufacturing a first substrate 400 according to various embodiments. FIG. 6C is a cross-sectional view illustrating a third process of manufacturing a first substrate 400 according to various embodiments. FIG. 6D is an exploded cross-sectional view illustrating an example of an operation of coupling an antenna structure 410, a second substrate 510, a first substrate 400, and/or a wireless communication circuit 430 according to various embodiments.

Referring to FIG. 6A, the first substrate 400 may include multiple conductive layers and/or multiple non-conductive layers alternately stacked with the multiple conductive layers. The first substrate 400 may be implemented to have a form in which multiple layers are stacked. According to an embodiment, the first substrate 400 may be formed to have a from including the recess area 540 (e.g., the recess area 402 in FIG. 4A, and a groove) such that the second substrate (e.g., the second substrate 510 in FIG. 4A) is at least partially coupled thereto, based on staked multiple layers. For example, some layers among multiple layers forming the first substrate 400 may be designed to include an opening for implementing the recess area 540. Referring to FIG. 6A, the recess area 540 may be implemented to have a form in which layers including an opening are stacked to form a groove having a depth of a first length 550 on the first substrate 400. Referring to FIG. 6A, the first substrate 400 may be manufactured to have the recess area 540 filled with a dielectric material (general material). The first substrate 400 may be implemented as a form including at least one via 611, 612, 613, 614 (e.g., the at least one via 511, 512, 513, 514 in FIG. 5) penetrating the first substrate 400. For example, at least one via 611, 612, 613, 614 may be used as an electrical connection path for respectively connecting at least one matching circuit (e.g., the at least one matching circuit 511, 512, 513, 514 in FIG. 5) included in the second substrate 510 and a wireless communication circuit (e.g., the wireless communication circuit 430 in FIG. 5). The at least one via 611, 612, 613, 614 may include a first via 611, a second via 612, a third via 613, and/or a fourth via 614.

Referring to FIG. 6B, the first substrate 400 may be subject to a second process in which the dielectric material filled in the recess area 540 is removed. For example, the dielectric material may be removed from the first substrate 400 using a milling machine to etch the dielectric material. Referring to FIG. 6B, the first substrate 400 may secure an insertion space corresponding to the recess area 540 such that the second substrate 510 may be inserted thereinto.

Referring to FIG. 6C, the first substrate 400 may be subject to a plating process (e.g., a third process) with respect to a portion exposed to an external environment. For example, a plating process may be performed with respect to a portion (e.g., 630 and 640) exposed to the outside, based on a first surface (e.g., a surface exposed to the outside when view from above (e.g., viewed from the z-axis direction along the −z-axis direction) of the first substrate 400 and a second surface facing a direction opposite to the first surface. For example, the plating process may be performed based on portions corresponding to one end 633, 634, 637, 638 and another end 642, 643, 646, 647 of the at least one via 611, 612, 613, 614, or a portion 631, 632, 635, 636, 639, 639-1 which corresponds to the first surface of the first substrate 400 and is exposed to the outside and a portion 641, 644, 645, 648 which corresponds to the second surface facing a direction opposite to the first surface and is exposed to the outside. According to an embodiment, in the first substrate 400, a metal member to which the plating process is performed may include a conductive pad. For example, the conductive pad may be formed on a partial area of the first substrate 400 and used as an electrical connection member for electrical connection between the second substrate 510 disposed on the first surface of the first substrate 400 and the wireless communication circuit 430 disposed on the second surface of the first substrate 400.

According to an embodiment, the second substrate 510 may be electrically connected to the first substrate 400, based on a conductive bonding process (e.g., soldering and a soldering process) with respect to a conductive pad 632, 633, 634, 635, 636, 637, 638, 639 formed on the first surface of the first substrate 400. According to an embodiment, the wireless communication circuit 430 may be electrically connected to the first substrate 400, based on a conductive bonding process with respect to a conductive pad 641, 642, 643, 644, 645, 646, 647, 648 formed on the second surface of the first substrate 400. According to an embodiment, the second substrate 510 and the wireless communication circuit 430 may be electrically connected to each other through a conductive pad 633, 634, 637, 638, 642, 643, 646, 647 formed based on at least one via 611, 612, 613, 614 included in the first substrate 400.

FIG. 6D is an exploded cross-sectional view illustrating an operation of coupling an antenna structure 410, a second substrate 510, a first substrate 400, and/or a wireless communication circuit 430. For example, the second substrate 510 may be coupled to the first substrate 400 in a form of being inserted into the recess area 540 formed on the first substrate 400 along a first direction 651 (e.g., the −z-axis direction). The antenna structure 410 may be at least partially coupled to the first substrate 400 and the second substrate 510 in a form of covering the second substrate 510 along the first direction 651. The wireless communication circuit 430 may be at least partially coupled to the lower end of the first substrate 400 along a second direction 652 (e.g., the z-axis direction). In an embodiment, the antenna structure 410, the second substrate 510, and the first substrate 400, and the wireless communication circuit 430 may be coupled and fixed to each other by a soldering method (e.g., a conductive bonding process and soldering). For example, by performing a conductive bonding process (e.g., soldering) with respect to a first conductive pad 632, 633, 634, 635, 636, 637, 638, 639 formed so as to correspond to the first surface (e.g., a surface exposed to the outside along a second direction (the z-axis direction)), the first substrate 400 may be electrically connected to the second substrate 510. For example, by performing a conductive bonding process (e.g., soldering) with respect to a second conductive pad 641, 642, 643, 644, 645, 646, 647, 648 formed so as to correspond to the second surface (e.g., a surface exposed to the outside along a first direction (the −z-axis direction), the first substrate 400 may be electrically connected to the wireless communication circuit 430. For example, the antenna structure 410 may be electrically connected to the first substrate 400 and the second substrate 510, based on a third conductive pad 631, 639-1 formed so as to correspond to the first surface of the first substrate 400 and a one-end contact part 511-1, 512-1, 513-1, 514-1 of the at least one matching circuit 511, 512, 513, 514 included in the second substrate 510.

Referring to FIG. 6D, an other-end contact part 511-2, 512-2, 513-2, 514-2 of the at least one matching circuit 511, 512, 513, 514 included in the second substrate 510 may be electrically connected to a (1-1)th conductive pad 633, 634, 637, 638 formed so as to correspond to the at least one via 611, 612, 613, 614 included in the first substrate 400. A one-end contact part 511-1, 512-1, 513-1, 514-1 of the at least one matching circuit 511, 512, 513, 514 included in the second substrate 510 may be electrically connected to the at least one circuit 521, 522, 523, 524 (e.g., a wire, a line, a hole, and a via) included in the antenna structure 410. For example, the second substrate 510 and the antenna structure 410 may be electrically connected to each other through a conductive bonding process (e.g., soldering). For example, at least one circuit 521, 522, 523, 524 may be electrically connected to the at least one antenna element 420 disposed on the antenna structure 410. For example, the first antenna element 421 may be electrically connected to a first one-end contact part 511-1 of a first matching circuit 511 through a first circuit 521. A first other-end contact part 511-2 of the first matching circuit 511 may be electrically connected to the wireless communication circuit 430 through the first via 611 of the first substrate 400. The wireless communication circuit 430 may transmit a signal to the first antenna element 421 and perform wireless communication with an external device (e.g., a server) through the first matching circuit 511 included in the second substrate 510.

Referring to FIG. 6D, a (2-1)th conductive pad 642, 643, 646, 647 formed corresponding the at least one via 611, 612, 613, 614 included in the first substrate 400 may be electrically connected to the wireless communication circuit 430. According to an embodiment, the at least one matching circuit 511, 512, 513, 514 included in the second substrate 510 may be variously implemented based on a position of the at least one circuit 521, 522, 523, 524 included in the antenna structure 410 and a position of the at least one via 611, 612, 613, 614 included in the first substrate 400.

Figure 7:
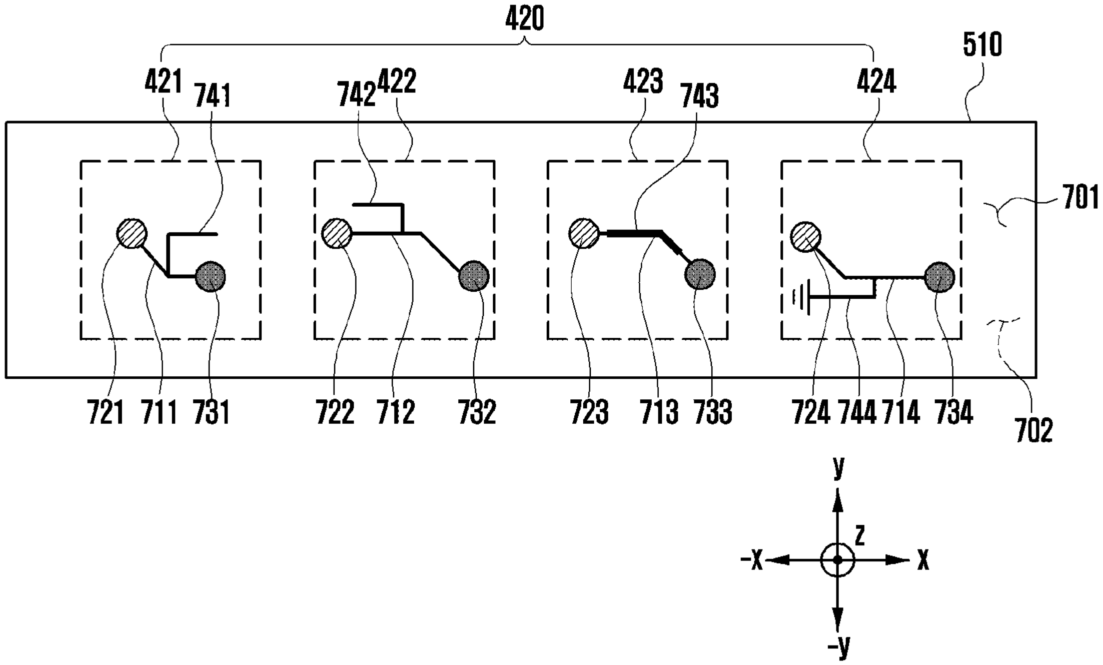
FIG. 7 is a diagram illustrating an example matching circuit included in a second substrate according to various embodiments.

FIG. 7 is a diagram illustrating an example matching circuit included in a second substrate 510 according to various embodiments.

According to various embodiments with reference to FIG. 7, the second substrate 510 may include at least one matching circuit 711, 712, 713, 714 (e.g., the at least one matching circuit 511, 512, 513, 514 in FIG. 5) corresponding to the at least one antenna element 420. For example, the at least one antenna element 711, 712, 713, 714 may be respectively connected so as to correspond to the at least one antenna element 421, 422, 423, 424. In the second substrate 510, an one-end contact part 721, 722, 723, 724 with respect to the at least one matching circuit 711, 712, 713, 714 may be exposed to the outside, corresponding to a first surface 701 of the second substrate 510 facing a first direction (e.g., the z-axis direction), and the one-end contact parts 721, 722, 723, 724 may be electrically connected to the at least one antenna elements 421, 422, 423, 424, respectively. In the second substrate 510, an other-end contact part 731, 732, 733, 734 with respect to the at least one matching circuit 711, 712, 713, 714 may be exposed to the outside, corresponding to a second surface 702 of the second substrate 510 facing a direction (e.g., a second direction and the −z-axis direction) opposite to the first surface 701, and the other-end contact parts 731, 732, 733, 734 may be electrically connected to the wireless communication circuit 430 through the at least one via (e.g., the at least one via 531, 532, 533, 534 in FIG. 5) of the first substrate 400.

For example, the first antenna element 421 may be electrically connected to a first one-end contact part 721 of the first matching circuit 711 and electrically connected to the wireless communication circuit 430 through a first other-end contact part 731 of the first matching circuit 711. According to an embodiment, the at least one matching circuit 711, 712, 713, 714 may be implemented in a form of a conductive pattern. For example, the at least one matching circuit 711, 712, 713, 714 may include an additional pattern 741, 742, 743, 744 in addition to the one-end contact part 721, 722, 723, 724 and the other-end contact part 731, 732, 733, 734, and the additional pattern 741, 742, 743, 744 may be used as an electrical path for a signal. At least one additional pattern 744 of the additional pattern 741, 742, 743, 744 may be connected to a ground portion (e.g., a GND and a ground).

According to an embodiment, the second substrate 510 may be designed to have a thick thickness of the matching circuit 711, 712, 713, 714 to facilitate impedance tuning with respect to an electrical signal and may be implemented to have low dielectric constant (DK) (e.g., a relative dielectric constant). For example, the second substrate 510 may be implemented, based on a material (e.g., a liquid crystal polymer) having a low relative dielectric constant. According to an embodiment, the second substrate 510 may be implemented to have DK and permittivity relatively lower than those of the first substrate 400 and/or the antenna structure 410. The second substrate 510 may be implemented to have low permittivity to increase transmission efficiency with respect to an electrical signal.

Figure 8:
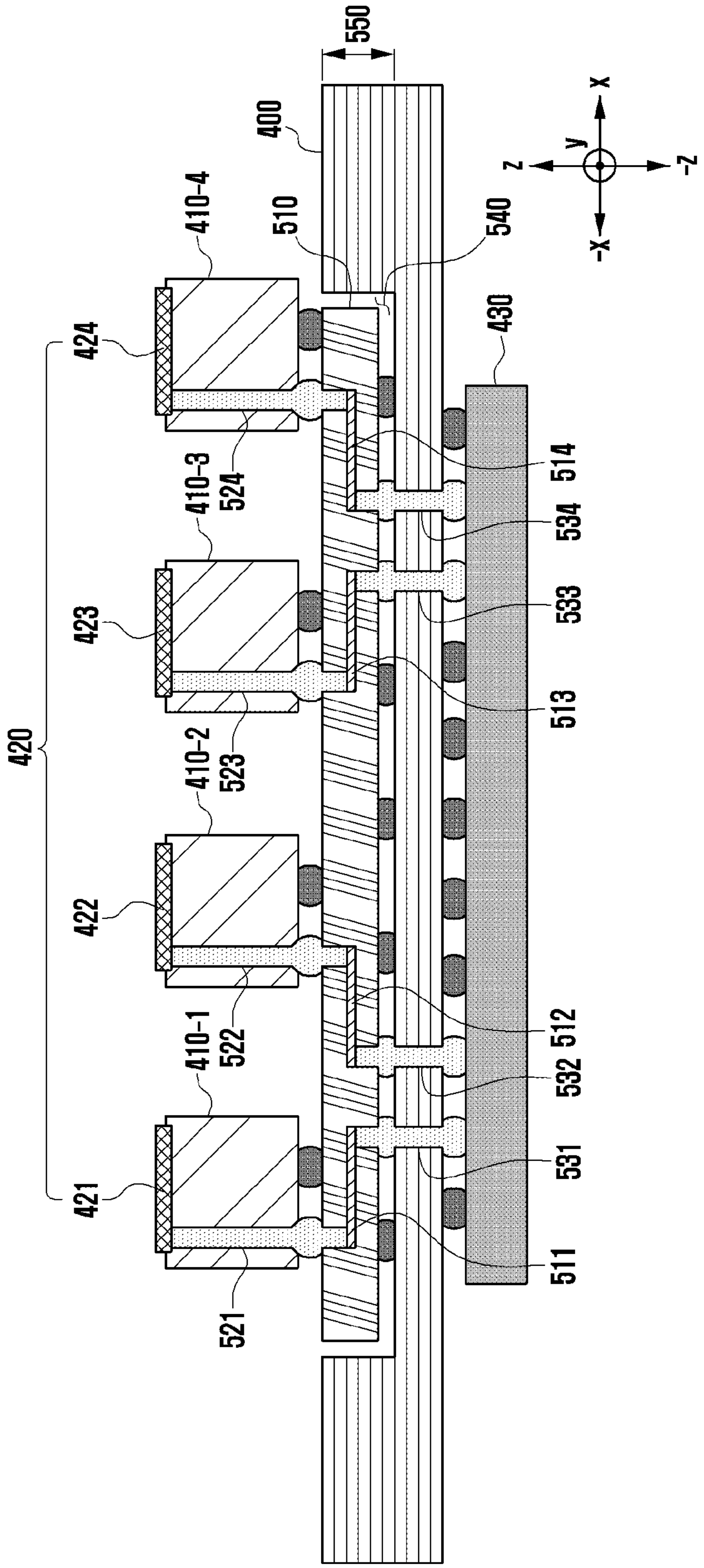
FIG. 8 is a cross-sectional view of an electronic device including antenna elements are attached to a second substrate as individual components according to various embodiments.

FIG. 8 is a cross-sectional view of an electronic device including an example in which antenna elements are attached to a second substrate 510 as individual components according to various embodiments.

Referring to FIG. 8, the second substrate 510 may be at least partially inserted into or coupled to the recess area 540 of the first substrate 400. The second substrate 510 may include at least one matching circuit 511, 512, 513, 514 corresponding to the at least one antenna element 420. For example, the at least one matching circuit 511, 512, 513, 514 may be respectively connected so as to correspond to the at least one matching circuit 421, 422, 423, 424.

Referring to FIG. 8, one or more antenna elements 421, 422, 423, 424 may be disposed to independent antenna structures 410-1, 410-2, 410-3, 410-4, respectively. For example, a first antenna element 421 may be disposed on a first antenna structure 410-1 and may be electrically connected to the first matching circuit 511 of the second substrate 510 through the first circuit 521 of the first antenna structure 410-1. For example, the first antenna structure 410-1 may be at least partially disposed on the second substrate 510 through a conductive bonding process (e.g., soldering). A second antenna element 422 may be disposed on a second antenna structure 410-2 and may be electrically connected to the second matching circuit 512 of the second substrate 510 through the second circuit 522 of the second antenna structure 410-2. For another example, a third antenna element 423 or a fourth antenna element 424 may be applied substantially identical to the first antenna element 421. According to an embodiment, at least one antenna element may be disposed on the antenna structure and each antenna element may be designed as an individual component.

According to an embodiment, at least one antenna element 421, 422, 423, 424 may be used as an array antenna and arranged at regular intervals. According to an embodiment, the antenna structure may be electrically connected to the second substrate 510 through a conductive bonding process (e.g., soldering).

According to various example embodiments, an electronic device (e.g., the electronic device 101 in FIG. 1) may include: a housing, a first substrate (e.g., the first substrate 400 in FIG. 4A and a main PCB) disposed in an inner space of the housing and including a first surface facing a first direction (e.g., the z-axis direction), a second surface facing a direction (e.g., the −z-axis direction) opposite to the first surface, and a first recess area (e.g., the recess area 402 in FIG. 4A) at least partially corresponding to the first surface, a second substrate (e.g., the second substrate 510 in FIG. 4A and a sub PCB) disposed in the first recess area of the first substrate, a third substrate (e.g., the antenna structure 410 in FIG. 4A) at least partially disposed on one surface of the second substrate and including multiple antenna elements including at least one antenna (e.g., the antenna element 420 in FIG. 4A), and a wireless communication circuit (e.g., the wireless communication circuit 430 in FIG. 4A) disposed on the second surface of the first substrate and electrically connected to the second substrate. The second substrate may include at least one matching circuit (e.g., the matching circuit 511, 512, 513, 514 in FIG. 5) electrically connected to the wireless communication circuit and corresponding to each of the multiple antenna elements.

According to an example embodiment, the first substrate may include at least one via (e.g., the via 531, 532, 533, 534 in FIG. 5) configured to electrically connect the second substrate and the wireless communication circuit.

According to an example embodiment, the first substrate may be have at least one layer stacked, a layer included in a first group among the at least one layer may include an opening corresponding to the first recess area.

According to an example embodiment, one end of the at least one matching circuit included in the second substrate may be electrically connected to the at least one antenna element included in the third substrate, and another end thereof may be electrically connected to the wireless communication circuit through the via included in the first substrate.

According to an example embodiment, the third substrate includes the at least one antenna element disposed at regular intervals and may comprise an array antenna based on the at least one antenna element.

According to an example embodiment, the third substrate may include a first antenna structure (e.g., the first antenna structure 410-1 in FIG. 8) on which a first antenna element comprising an antenna is disposed, and a second antenna structure (e.g., the second antenna structure 410-2 in FIG. 8) on which a second antenna element comprising an antenna is disposed and comprise an array antenna based on the first antenna element and the second antenna element.

According to an example embodiment, the third substrate may be at least partially disposed on at least one of the first substrate and the second substrate.

According to an example embodiment, the second substrate may comprise a material having permittivity lower than a permittivity of the first substrate or transmission loss less than a specified threshold with respect to an electrical signal.

According to an example embodiment, the third substrate may have a dielectric constant (DK) value greater than a DK value of the first substrate and the second substrate and a permittivity substantially the same as a permittivity of the second substrate.

According to an example embodiment, the number of the at least one matching circuit may be based on the number of the antenna elements disposed on the third substrate, and the at least one matching circuit may comprise a conductive pattern.

Figure 9A:
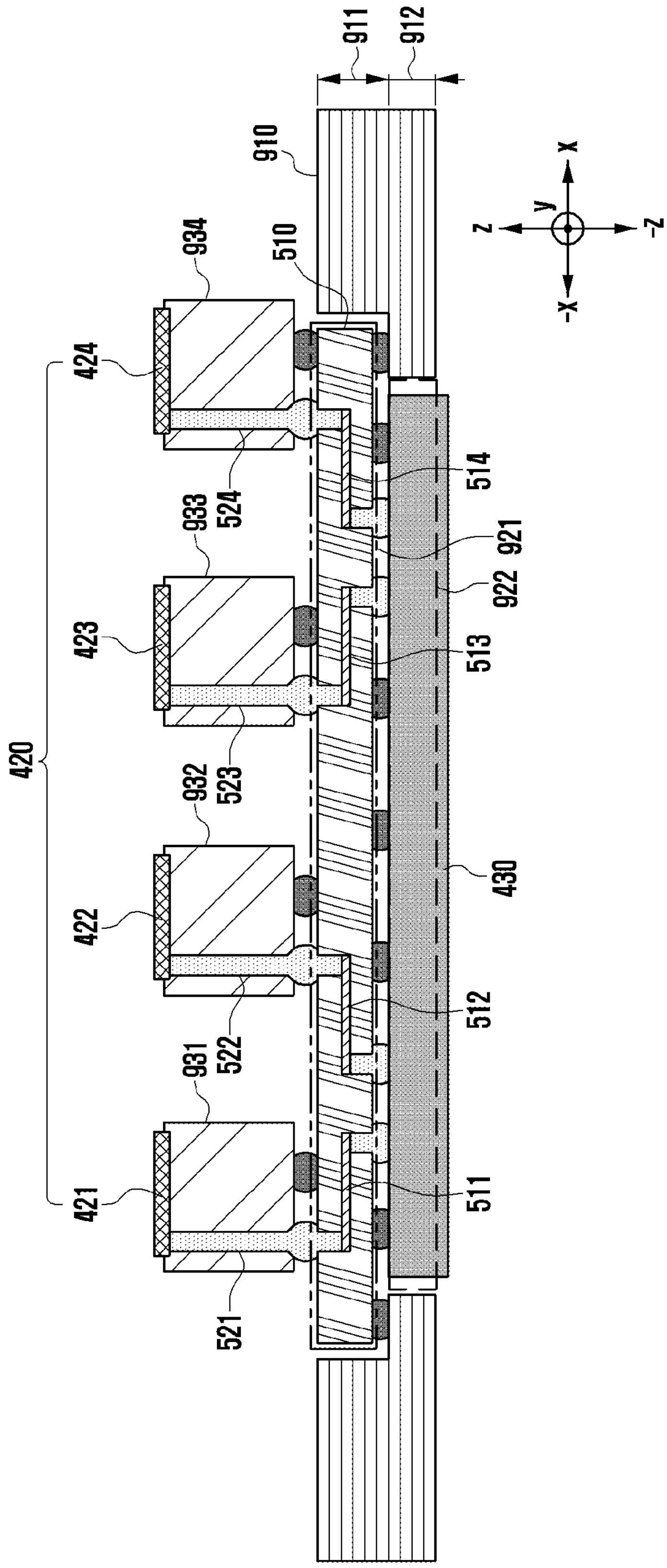
FIG. 9A is a cross-sectional view of an electronic device including a second substrate and a wireless communication circuit that are directly connected according to various embodiments.
Figure 9B:
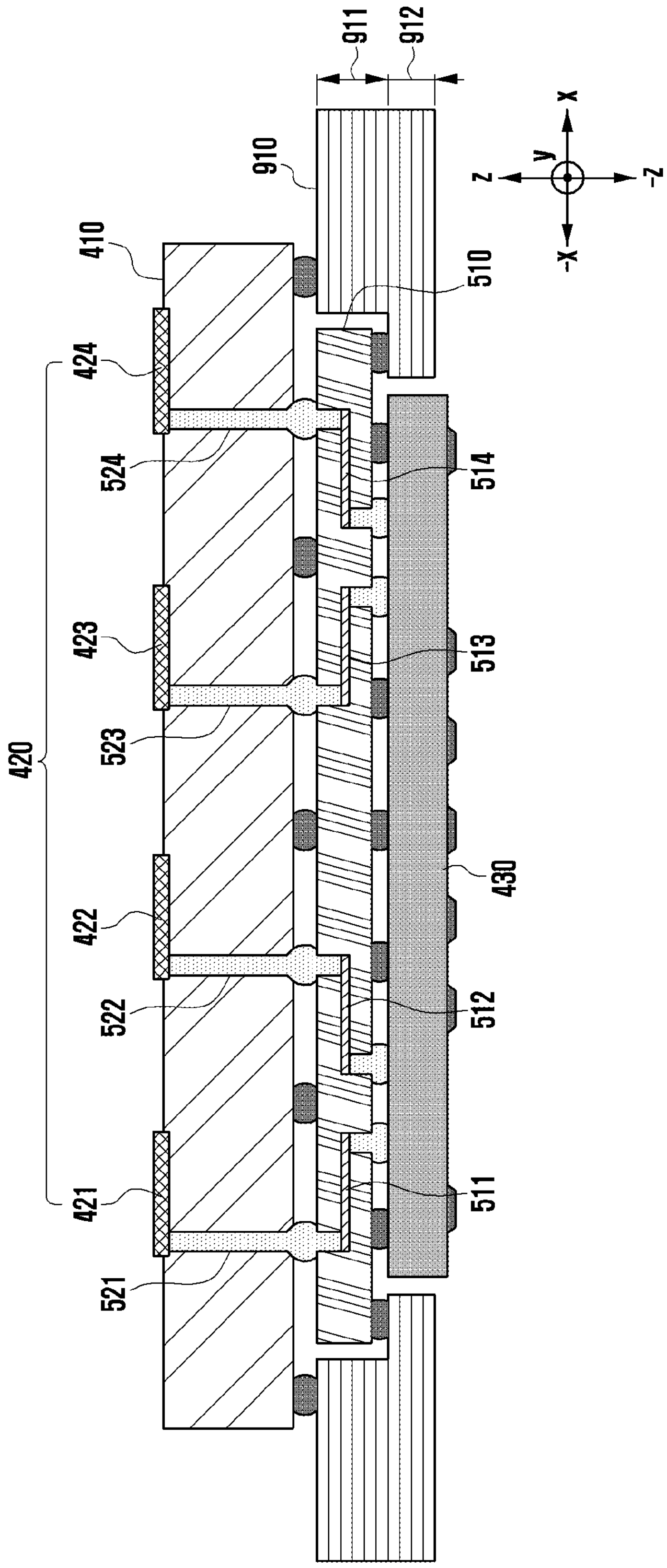
FIG. 9B is a cross-sectional view of an electronic device including antenna elements arranged in one antenna structure in the structure shown in FIG. 9A according to various embodiments.
Figure 9C:
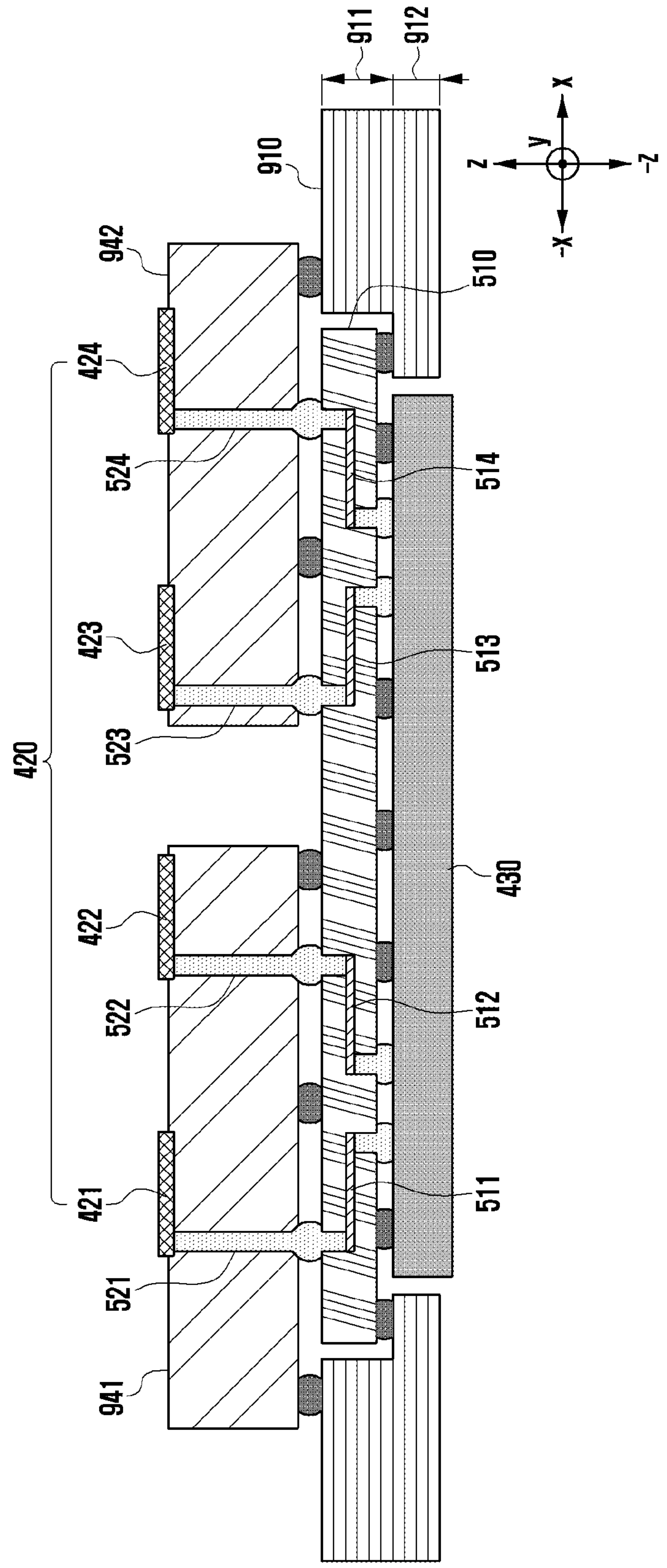
FIG. 9C is a cross-sectional view of an electronic device including at least two antenna elements arranged in one antenna structure in the structure shown in FIG. 9A according to various embodiments.

FIG. 9A is a cross-sectional view of an electronic device in which a second substrate 510 and a wireless communication circuit 430 are directly connected according to various embodiments. FIG. 9B is a cross-sectional view of an electronic device including a form in which antenna elements 420 are arranged in one antenna structure 410 in the structure shown in FIG. 9A according to various embodiments. FIG. 9C is a cross-sectional view of an electronic device in which at least two antenna elements are arranged in one antenna structure in the structure shown in FIG. 9A according to various embodiments.

Referring to FIG. 9A, the first substrate 910 (e.g., the first substrate 400 in FIG. 4A) may include multiple conductive layers and/or multiple non-conductive layers alternately stacked with the multiple conductive layers. The first substrate 910 may be implemented to have a form in which multiple layers are stacked. According to an embodiment, the first substrate 910 may include multiple layers stacked in a form including a first recess area 921 (e.g., a furrow, a groove, and a cavity) for receiving the second substrate 510 (e.g., the second substrate 510 in FIG. 4A) at least partially coupled thereto and a second recess area 922 for receiving a wireless communication circuit 430 (e.g., the wireless communication circuit 430 in FIG. 4A) at least partially located therein. For example, layers included in a first group among multiple layers forming the first substrate 910 may be designed to include an opening for implementing the first recess area 921, and layers included in a second group may be designed to include an opening for forming the second recess area 922. For example, the first recess area 921 may be implemented to have a first depth 911 (e.g., a first length) by stacking the layers included in the first group, and the second recess area 922 may be implemented to have a second depth 912 (e.g., a second length) by stacking the layers included in the second group. When the layers included in the first group are stacked, the first recess area 921 having the first depth 911 may be implemented, and when the layers included in the second group are stacked, the second recess area 922 having a second depth 912 may be implemented. According to an embodiment, the first recess area 921 may include an opening having a size relatively larger than that of the second recess area 922.

Referring to FIG. 9A, the second substrate 510 may be coupled to the first substrate 910 in a form of being inserted into the first recess area 921, and the wireless communication circuit 430 may be located on the first substrate 910 in a form of being inserted into the second recess area 922. The second substrate 510 and the wireless communication circuit 430 may be in direct or physical contact with each other and may be electrically connected to each other.

In an embodiment, the first recess area 921 and the second recess area 922 may communicate with each other and one opening may be formed to penetrate the first substrate 910. For example, a size of the one opening may be determined based on the second recess area 922. According to an embodiment, the second substrate 510 and the wireless communication circuit 430 may be directly or physically connected to each other through the one opening.

Referring to FIG. 9A, the second substrate 510 may include at least one matching circuit 511, 512, 513, 514 corresponding to the at least one antenna element 420. For example, the at least one matching circuit 511, 512, 513, 514 may be respectively connected so as to correspond to the at least one matching circuit 421, 422, 423, 424.

Referring to FIG. 9A, one or more antenna elements 421, 422, 423, 424 may be disposed to independent antenna structures 931, 932, 933, 934, respectively. For example, a first antenna element 421 may be disposed on a first antenna structure 931 and may be electrically connected to the first matching circuit 511 of the second substrate 510 through the first circuit 521 of the first antenna structure 931. A second antenna element 422 may be disposed on a second antenna structure 932 and may be electrically connected to the second matching circuit 512 of the second substrate 510 through the second circuit 522 of the second antenna structure 932. For another example, a third antenna element 423 or a fourth antenna element 424 may be applied substantially identical to the first antenna element 421. According to an embodiment, at least one antenna element may be disposed on the antenna structure and each antenna element may be designed as an individual component.

Referring to FIG. 9B, in the arrangement structure shown in FIG. 9A, at least one antenna elements 421, 422, 423, 424 may be arranged on one antenna structure 410 at regular intervals. For example, each of antenna elements may be arranged on the antenna structure 930 parallel with each other and may be electrically connected to the matching circuit 511, 512, 513, 514 of the second substrate 510 through the at least circuit 521, 522, 523, 524 included in the antenna structure 930. The at least one antenna element 421, 422, 423, 424 may be used as an array antenna and arranged parallel with each other at regular intervals.

According to an embodiment, the structure in FIG. 9B may have both ends of the antenna structure 930 attached and fixed to the first substrate 910 and thus has rigidity relatively stronger than the structure in FIG. 9A.

Referring to FIG. 9C, in the arrangement structure shown in FIG. 9A, at least one antenna elements 421, 422, 423, 424 may be arranged on a first antenna structure 941 and/or a second antenna structure 942 at regular intervals. For example, the first antenna element 421 and the second antenna element 422 may be disposed on the first antenna structure 941 and may be electrically connected to matching circuits 511, 512 of the second substrate 510 through the first circuit 521 and the second circuit 522 included in the first antenna structure 941. For example, the third antenna element 423 and the fourth antenna element 424 may be disposed on the second antenna structure 942 and may be electrically connected to matching circuits 513, 514 of the second substrate 510 through the third circuit 523 and the fourth circuit 524 included in the second antenna structure 942. The at least one antenna element 421, 422, 423, 424 may be used as an array antenna and arranged parallel with each other at regular intervals.

According to an embodiment, in the structure in FIG. 9C, a portion of the first antenna structure 941 may be attached to the first substrate 910 and a remaining portion of the first antenna structure 941 may be attached to the second substrate 510. In the structure in FIG. 9C, a portion of the second antenna structure 942 may be attached to the first substrate 910 and a remaining portion of the second antenna structure 942 may be attached to the second substrate 510. The structure in FIG. 9C includes the first antenna structure 941 and the second antenna structure 942 which are disposed over the first substrate 910 and the second substrate 510 and may thus have rigidity relatively stronger than that of the structure in FIG. 9A. However, the structure in FIG. 9C may have rigidity relatively weaker than that of the structure in FIG. 9B.

Figure 10A:
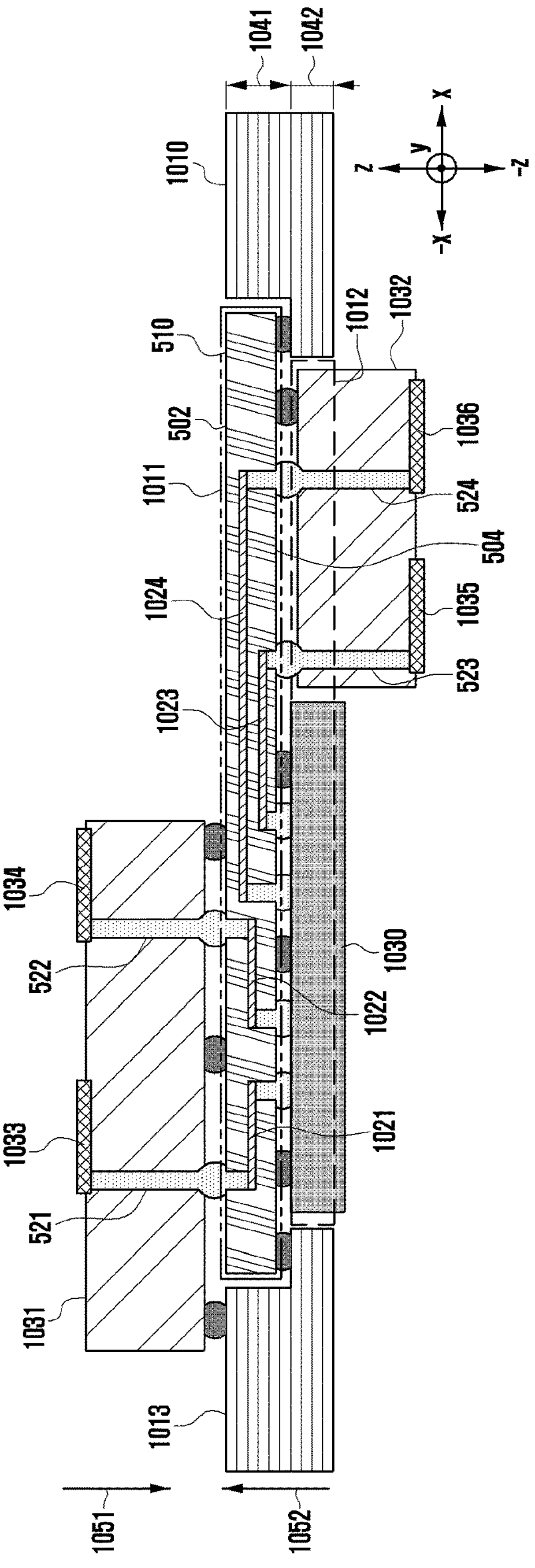
FIG. 10A is a cross-sectional view of an electronic device including an example in which a first antenna structure is disposed to correspond to one surface of a second substrate and a second antenna structure is disposed to correspond to the other surface of the second substrate according to various embodiments.

FIG. 10A is a cross-sectional view of an electronic device in which a first antenna structure 1031 is disposed to correspond to a surface (e.g., a surface facing a second direction 1052 (e.g., the z-axis direction) of a second substrate 510 and a second antenna structure 1032 is disposed to correspond to the other surface (e.g., a surface facing a first direction 1051 (e.g., the −z-axis direction) of the second substrate 510 according to various embodiments.

Referring to FIG. 10A, a first substrate 1010 (e.g., the first substrate 400 in FIG. 4A) may include multiple conductive layers and/or multiple non-conductive layers alternately stacked with the multiple conductive layers. The first substrate 1010 may be implemented to have a form in which multiple layers are stacked. According to an embodiment, the first substrate 1010 may include multiple layers stacked in a form including a first recess area 1011 (e.g., the first recess area 921 in FIG. 9A, a furrow, a groove, and a cavity) for receiving the second substrate 510 (e.g., the second substrate 510 in FIG. 4A) at least partially coupled thereto and a second recess area 1012 (e.g., the second recess area 922 in FIG. 9A) for receiving a wireless communication circuit 1030 (e.g., the wireless communication circuit 430 in FIG. 4A) and a second antenna structure 1032 at least partially coupled thereto. For example, layers included in a first group among multiple layers forming the first substrate 1010 may be designed to include an opening for implementing the first recess area 1011, and layers included in a second group may be designed to include an opening for forming the second recess area 1012. For example, the first recess area 1011 may be implemented to have a first depth 1041 (e.g., a first length) by stacking the layers included in the first group, and the second recess area 1012 may be implemented to have a second depth 1042 (e.g., a second length) by stacking the layers included in the second group.

Referring to FIG. 10A, the second substrate 510 may be at least partially coupled to the first substrate 1010 in a form of being inserted into the first recess area 1011, and the wireless communication circuit 1030 may be at least partially coupled to the second substrate 510 in a form of being inserted into the second recess area 1012. The second substrate 510 and the wireless communication circuit 1030 may be in direct or physical contact with each other and may be electrically connected to each other.

Referring to FIG. 10A, the second substrate 510 may include the first antenna structure 1031 disposed on one surface thereof along the first direction 1051 and the second antenna structure 1032 disposed on the other surface thereof along the second direction 1052. For example, the first antenna structure 1031 may include a first antenna element 1033 and a second antenna element 1034 disposed thereon, and the second antenna structure 1032 may include a third antenna elements 1035 and a fourth antenna element 1036 disposed thereon. The second substrate 510 may include at least one matching circuit 1021, 1022, 1023, 1024 for electrically connecting the at least one antenna element 1033, 1034, 1035, 1036 to the wireless communication circuit 1030. For example, the at least one matching circuit 1021, 1022, 1023, 1024 may be respectively connected so as to correspond to the at least one matching circuit 1033, 1034, 1035, 1036.

Referring to FIG. 10A, the first antenna structure 1031 on which the first antenna element 1033 and the second antenna element 1034 among multiple antenna elements 1033, 1034, 1035, 1036 are disposed may be at least partially disposed on a first surface 502 (e.g., the first surface 502 of the second substrate 510 in FIG. 4A) of the second substrate 510 and a first surface 1013 (e.g., the first surface 404 of the first substrate 400 in FIG. 4A) of the first substrate 1010. The second antenna structure 1032 on which the third antenna element 1033 and the fourth antenna element 1034 among multiple antenna elements 1035, 1036, 1035, 1036 are disposed may be at least partially coupled to a second surface 504 (e.g., the second surface 504 of the second substrate 510 in FIG. 4A) of the second substrate 510. According to an embodiment, the first antenna element 1031 may be disposed so as to correspond to the first surface 502 of the second substrate 510, and the second antenna structure 1032 may be disposed so as to correspond to the second surface 504 of the second substrate 510, which corresponds to an opposite direction of the first surface. According to an embodiment, the number of antenna elements disposed on the first antenna structure 1031 and the second antenna structure 1032 is not limited, and the number of matching circuits included in the second substrate 510 is also not limited.

According to an embodiment, the second substrate 510 may include the first antenna structure 1031 disposed on the first surface 502 thereof along the first direction 1051 and the second antenna structure 1032 disposed on the second surface 504 thereof along the second direction 1052. The first antenna structure 1031 and the second antenna structure 1032 may be disposed to have a form in which signals are radiated in opposite directions. According to an embodiment, the first antenna structure 1031 and the second antenna structure 1032 may include antenna elements each independently formed in a form of an antenna array.

Figure 10B:
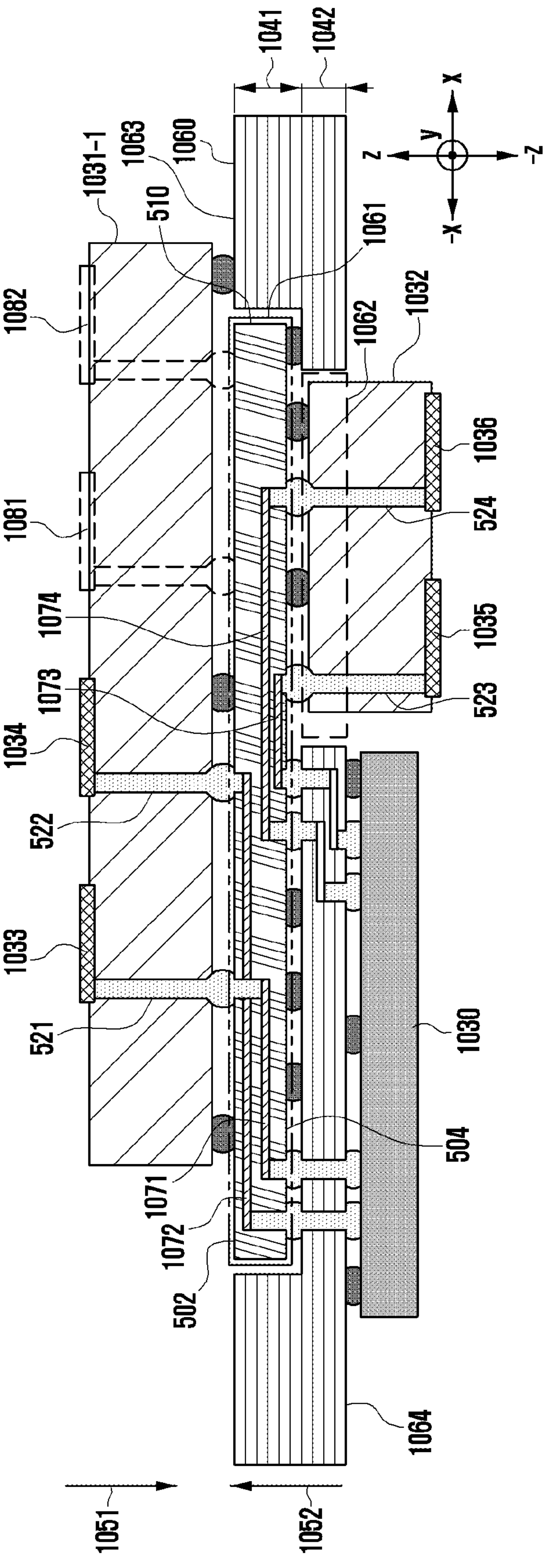
FIG. 10B is a cross-sectional view of an electronic device including an example in which a first antenna structure is disposed to correspond to one surface of a second substrate and a second antenna structure is disposed to correspond to the other surface of the second substrate according to various embodiments.

FIG. 10B is a cross-sectional view of an electronic device in which a (1-1)th antenna structure 1031-1 is disposed to correspond to a surface (e.g., the first surface 502) of a second substrate 510 and a second antenna structure 1032 is disposed to correspond to the other surface (e.g., the second surface 504) of the second substrate 510 according to various embodiments.

Referring to FIG. 10B, a first substrate 1060 (e.g., the first substrate 400 in FIG. 4A) may include multiple conductive layers and/or multiple non-conductive layers alternately stacked with the multiple conductive layers. The first substrate 1060 may be implemented to have a form in which multiple layers are stacked. According to an embodiment, the first substrate 1060 may include multiple layers stacked in a form including a first recess area 1061 (e.g., a furrow, a groove, and a cavity) for receiving the second substrate 510 (e.g., the second substrate 510 in FIG. 4A) at least partially coupled thereto and a second recess area 1062 for receiving a second antenna structure 1032 at least partially coupled thereto. For example, layers included in a first group among multiple layers forming the first substrate 1060 may be designed to include a first opening for implementing the first recess area 1061, and layers included in a second group may be designed to include a second opening for forming the second recess area 1062. For example, the first recess area 1061 may be implemented to have a first depth 1041 (e.g., a first length) by stacking the layers included in the first group, and the second recess area 1062 may be implemented to have a second depth 1042 (e.g., a second length) by stacking the layers included in the second group.

Referring to FIG. 10B, the second substrate 510 may be at least partially coupled to the first substrate 1060 in a form of being inserted into the first recess area 1061 so as to correspond to a first surface 1063 (e.g., the first surface 404 of the first substrate 400 in FIG. 4A) of the first substrate 1060 along the first direction 1051. The wireless communication circuit 1030 (e.g., the wireless communication circuit 430 in FIG. 4A) may be at least partially disposed on the second surface 1064 (e.g., the second surface 406 of the first substrate 400 in FIG. 4A) of the first substrate 1060 along the second direction 1052. The first substrate 1060 may include at least one via (e.g., the via 531, 532, 533, 534 in FIG. 5) for electrically connecting the wireless communication circuit 1030 and the second substrate 510. According to an embodiment, the second substrate 510 may be electrically connected to the wireless communication circuit 1030 through the at least one via included in the first substrate 1060.

Referring to FIG. 10B, the second substrate 510 may include at least one matching circuit 1071, 1072, 1073, 1074 electrically connected based on the at least one antenna element 1033, 1034, 1035, 1036. For example, the at least one matching circuit 1071, 1072, 1073, 1074 may be respectively connected so as to correspond to the at least one matching circuit 1033, 1034, 1035, 1036.

Referring to FIG. 10B, the (1-1)th antenna structure 1031-1 on which the first antenna element 1033 and the second antenna element 1034 among multiple antenna elements 1033, 1034, 1035, 1036 are disposed may be at least partially disposed on a first surface 502 (e.g., the first surface 502 of the second substrate 510 in FIG. 4A) of the second substrate 510 and a first surface 1063 (e.g., the first surface 404 of the first substrate 400 in FIG. 4A) of the first substrate 1010. The second antenna structure 1032 on which the third antenna element 1035 and the fourth antenna element 1036 among multiple antenna elements 1035, 1036, 1035, 1036 are disposed may be at least partially coupled to a second surface 504 (e.g., the second surface 504 of the second substrate 510 in FIG. 4A) of the second substrate 510. According to an embodiment, a size of the first recess area 1061 may be determined based on a size of the second substrate 510, and a size of the second recess area 1062 may be determined based on a size of the second antenna structure 1032. Referring to FIG. 10B, the wireless communication circuit 1030 may be at least partially coupled to the first substrate 1060 along the second direction 1052. According to an embodiment, the number of antenna elements disposed on the (1-1)th antenna structure 1031-1 and the second antenna structure 1032 is not limited, and the number of matching circuits included in the second substrate 510 is also not limited.

According to an embodiment, the (1-1)th antenna element 1031-1 may further include a first antenna element 1033, a second antenna element 1034, a fifth antenna element 1081, and/or a sixth antenna element 1082. For example, a matching circuit included in the second substrate 510 may be further added based on the fifth antenna element 1081 or the sixth antenna element 1082. According to an embodiment, the (1-1)th antenna structure 1031-1 and the second antenna structure 1032 may be disposed to have a form in which signals are radiated in opposite directions. According to an embodiment, antenna elements included in the (1-1)th antenna structure 1031-1 may be arranged in a form of an antenna array.

According to an embodiment, since a space corresponding to the second recess area 1032 of the structure in FIG. 10B is relatively smaller than that of the structure in FIG. 10A (e.g., since a space occupied by the first substrate 1060 of the structure in FIG. 10B is relatively larger than that of the structure in FIG. 10*a*), the structure in FIG. 10B may have relatively stronger rigidity.

Figure 11:
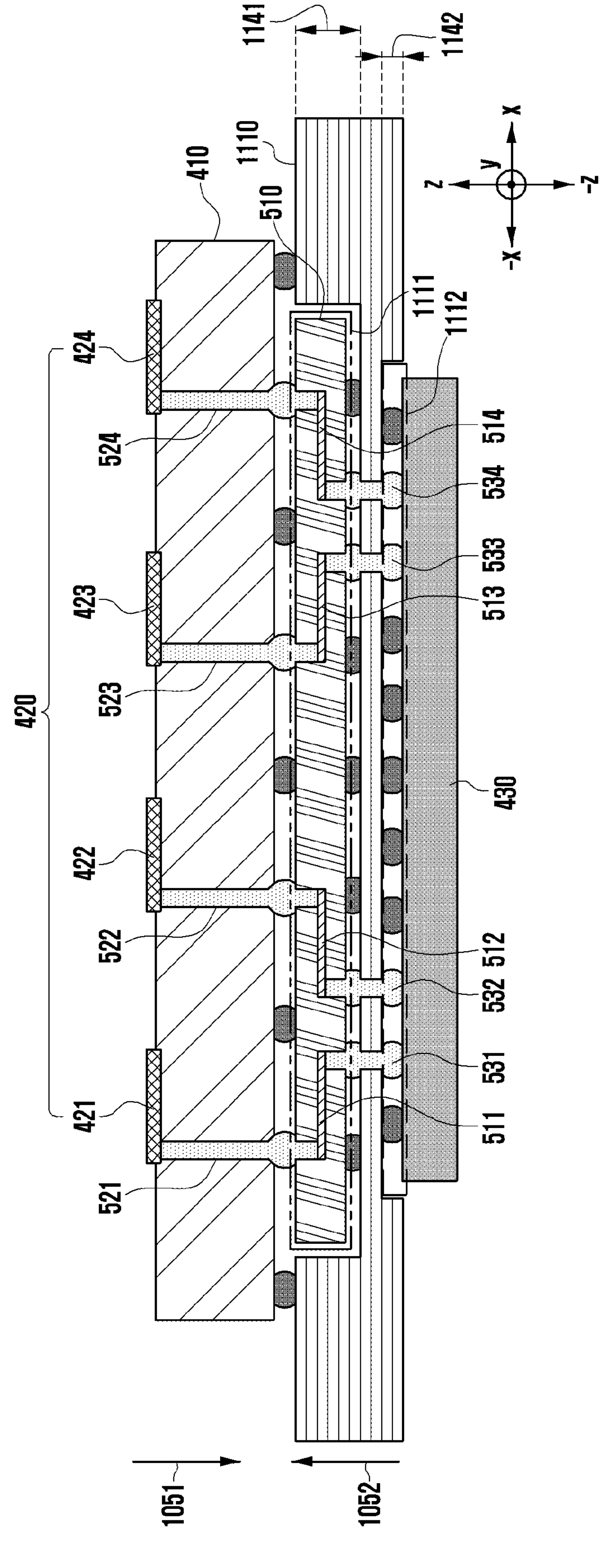
FIG. 11 is a cross-sectional view of an electronic device including an example in which an antenna structure, a second substrate, and/or a wireless communication circuit are coupled to each other on a first substrate including a first recess area implemented such that the second substrate is inserted thereinto and a second recess area implemented such that the wireless communication circuit is inserted thereinto according to various embodiments.

FIG. 11 is a cross-sectional view of an electronic device in which an antenna structure 410, a second substrate 510, and/or a wireless communication circuit 430 are coupled to each other on a first substrate 1110 including a first recess area 1111 implemented thereon such that the second substrate 510 is inserted thereinto and a second recess area 1112 implemented such that the wireless communication circuit 430 is inserted thereinto according to various embodiments.

Referring to FIG. 11, the first substrate 1110 (e.g., the first substrate 400 in FIG. 4A) may include multiple conductive layers and/or multiple non-conductive layers alternately stacked with the multiple conductive layers. The first substrate 1110 may be implemented to have a form in which multiple layers are stacked. According to an embodiment, the first substrate 1110 may include multiple layers stacked in a form including a first recess area 1111 (e.g., a furrow, a groove, and a cavity) for receiving the second substrate 510 (e.g., the second substrate 510 in FIG. 4A) at least partially coupled thereto and a second recess area 1112 for receiving a wireless communication circuit 430 (e.g., the wireless communication circuit 430 in FIG. 4A) at least partially coupled thereto. For example, layers included in a first group among multiple layers forming the first substrate 1110 may be designed to include a first opening for implementing the first recess area 1111, and layers included in a second group may be designed to include a second opening for forming the second recess area 1112. For example, the first recess area 1111 may be implemented to have a first depth 1141 (e.g., a first length) by stacking the layers included in the first group, and the second recess area 1112 may be implemented to have a second depth 1142 (e.g., a second length) by stacking the layers included in the second group. Some layers of the multiple layers may be implemented to include at least one via 531, 532, 533, 534 for electrically connecting the second substrate 510 and the wireless communication circuit 430.

Referring to FIG. 11, the second substrate 510 may be at least partially coupled to the first substrate 1110 in a form of being inserted into the first recess area 1111, and the wireless communication circuit 430 may be at least partially coupled to the first substrate 1110 in a form of being inserted into the second recess area 1112. For example, the first substrate 1110 may include at least one via 531, 532, 533, 534 electrically connecting the second substrate 510 and the wireless communication circuit 430. According to an embodiment, the second substrate 510 and the wireless communication circuit 430 may be electrically connected to each other through the at least one via 531, 532, 533, 534 of the first substrate 1110.

Since the structure in FIG. 11 includes some layers of the multiple layers forming the first substrate 1110 not including an opening, and thus may have rigidity relatively stronger than the structure in FIG. 10A and the structure in FIG. 10B.

According to various example embodiments, an electronic device (e.g., the electronic device 101 in FIG. 1) may include: a housing, a first substrate (e.g., the first substrate 910 in FIG. 9A and a main PCB) disposed in an inner space of the housing and including a first surface facing a first direction (e.g., the z-axis direction), a second surface facing a direction opposite to the first surface, a first recess area (e.g., the first recess area 921 in FIG. 9A) at least partially corresponding to the first surface, and a second recess area (e.g., the second recess area 922 in FIG. 9A) at least partially corresponding to the second surface, a second substrate (e.g., the second substrate 510 in FIG. 4A and a sub PCB) disposed in the first recess area of the first substrate, a third substrate (e.g., the antenna structure 410 in FIG. 4A) at least partially disposed on one surface of the second substrate and including multiple antenna elements including at least one antenna (e.g., the antenna element 420 in FIG. 4A), and a wireless communication circuit (e.g., the wireless communication circuit 430 in FIG. 4A) disposed in the second recess area of the first substrate. The second substrate may include at least one matching circuit (e.g., the matching circuit 511, 512, 513, 514 in FIG. 5A) electrically connected to the wireless communication circuit corresponding to each of the multiple antenna elements.

According to an example embodiment, the first substrate may include at least one stacked layer, a layer included in a first group among the at least one layer may include a first opening corresponding to the first recess area, and a layer included in a second group among the at least one layer may include a second opening corresponding to the second recess area.

According to an example embodiment, one end of the at least one matching circuit included in the second substrate may be electrically connected to the at least one antenna element included in the third substrate, and another end thereof may be electrically connected to the wireless communication circuit.

According to an example embodiment, the second substrate and the wireless communication circuit may be physically and directly connected to each other, based on the first recess area and the second recess area.

According to an example embodiment, the first substrate may include a hole penetrating the first substrate, based on the first recess area and the second recess area.

According to an example embodiment, the third substrate may include a first antenna structure including an antenna (e.g., the first antenna structure 1031 in FIG. 10A) disposed based on one surface of the second substrate disposed in the first recess area and a second antenna structure including an antenna (e.g., the second antenna structure 1032 in FIG. 10A) disposed on the other surface of the second substrate based on the second recess area.

According to an example embodiment, the first antenna structure may include at least one first antenna element disposed at regular intervals, and a wireless communication signal may be emitted along the first direction (e.g., the z-axis direction), based on the at least one first antenna element.

According to an example embodiment, the second antenna structure may include at least one second antenna element disposed at regular intervals, and a wireless communication signal may be radiated along the second direction (e.g., the z-axis direction), based on the at least one second antenna element.

According to an example embodiment, the second antenna structure may be disposed on the other surface of the second substrate together with the wireless communication circuit, based on the second recess area (e.g., the second recess area 1012 in FIG. 10A).

According to an example embodiment, the second substrate comprise a material having a permittivity less than a permittivity of the first substrate or transmission loss less than a transmission loss with respect to an electrical signal.

According to an example embodiment, the third substrate may be at least partially disposed on at least one of the first substrate and the second substrate.

According to an example embodiment, the number of the at least one matching circuit may be based on the number of the antenna elements disposed on the third substrate, and the at least one matching circuit may comprise a conductive pattern.

According to an example embodiment, the first substrate (e.g., the first substrate 1110 in FIG. 11) may include at least one via (e.g., the via 531, 532, 533, 534 in FIG. 11) configured to connect the first recess area (e.g., the first recess area 1111 in FIG. 11) and the second recess area (e.g., the second recess area 1112 in FIG. 11), one end of the at least one matching circuit may be electrically connected to the at least one antenna element included in the third substrate, and another end of the least one matching circuit may be electrically connected to the wireless communication circuit through the at least one via of the first substrate.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. It is intended that features described with respect to separate embodiments, or features recited in separate claims, may be combined unless such a combination is explicitly specified as being excluded or such features are incompatible.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases.

As used herein, such terms as “1st” and “2nd,” or “first” and “second” may be used to simply distinguish a corresponding component from another, and does not limit the components in other aspect (e.g., importance or order).

It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the “non-transitory” storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a housing;

a first substrate disposed in an inner space of the housing and comprising a first surface facing a first direction, a second surface facing a direction opposite to the first surface, and a first recess area at least partially corresponding to the first surface;

a second substrate at least partially disposed in the first recess area of the first substrate;

a third substrate at least partially disposed on one surface of the second substrate and comprising multiple antenna elements each comprising at least one antenna; and a wireless communication circuit disposed on the second surface of the first substrate and electrically connected to the second substrate through at least one via included in the first substrate, wherein the second substrate comprises a plurality of matching circuits electrically connected to the wireless communication circuit corresponding to each of the multiple antenna elements, and wherein the first substrate comprises the first recess area for insertion of the second substrate such that the third substrate is closer to the wireless communication circuit than if the second substrate was disposed on the first substrate without the first recess area.

2. The electronic device of claim 1, wherein the first substrate comprises the at least one via configured to electrically connect the second substrate and the wireless communication circuit.

3. The electronic device of claim 1, wherein the first substrate comprises at least one stacked layer, and a layer included in a first group among the at least one layer comprises an opening corresponding to the first recess area.

4. The electronic device of claim 1, wherein one end of each of the plurality of matching circuits included in the second substrate is electrically connected to the at least one antenna element included in the third substrate and another end of each of the plurality of matching circuits is electrically connected to the wireless communication circuit through the via included in the first substrate.

5. The electronic device of claim 4, wherein the third substrate comprises at least one antenna element disposed at regular intervals and comprising an array antenna, based on the at least one antenna element.

6. The electronic device of claim 5, wherein the third substrate comprises a first antenna structure on which a first antenna element is disposed and a second antenna structure on which a second antenna element is disposed, and comprises the array antenna, based on the first antenna element and the second antenna element.

7. The electronic device of claim 5, wherein the third substrate is at least partially disposed on one of the first substrate and the second substrate.

8. The electronic device of claim 1, wherein the second substrate is comprises a material having permittivity less than a permittivity of the first substrate or a transmission loss lower than a transmission loss of an electrical signal, and wherein the third substrate has a dielectric constant (DK) value relatively larger than a DK of the first substrate and permittivity substantially the same as a permittivity of the second substrate.

9. The electronic device of claim 1, wherein the number of the plurality of matching circuits is based on the number of antenna elements disposed on the third substrate, and wherein each of the plurality of matching circuits comprises a conductive pattern.

10. An electronic device comprising:

a housing;

a first substrate disposed in an inner space of the housing and comprising a first surface facing a first direction, a second surface facing a direction opposite to the first surface, and a first recess area at least partially corresponding to the first surface, wherein the first recess area is positioned within a perimeter of the first substrate when viewed from a position orthogonal to a plane of the first substrate;

a second substrate at least partially disposed in the first recess area of the first substrate;

a third substrate at least partially disposed on one surface of the second substrate and comprising multiple antenna elements each comprising at least one antenna; and a wireless communication circuit disposed on the second surface of the first substrate and electrically connected to the second substrate through at least one via included in the first substrate, wherein the second substrate comprises a plurality of matching circuits electrically connected to the wireless communication circuit corresponding to each of the multiple antenna elements, and wherein the first substrate comprises the first recess area for insertion of the second substrate such that the third substrate is closer to the wireless communication circuit than if the second substrate was disposed on the first substrate without the first recess area.

* * * * *